US012365180B2

(12) United States Patent
Matsumoto

(10) Patent No.: US 12,365,180 B2
(45) Date of Patent: Jul. 22, 2025

(54) RECORDING HEAD AND RECORDING DEVICE

(71) Applicant: KYOCERA CORPORATION, Kyoto (JP)

(72) Inventor: Shigeto Matsumoto, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 240 days.

(21) Appl. No.: 18/254,878

(22) PCT Filed: Nov. 24, 2021

(86) PCT No.: PCT/JP2021/042990
§ 371 (c)(1),
(2) Date: May 29, 2023

(87) PCT Pub. No.: WO2022/114002
PCT Pub. Date: Jun. 2, 2022

(65) Prior Publication Data

US 2024/0017543 A1 Jan. 18, 2024

(30) Foreign Application Priority Data

Nov. 30, 2020 (JP) ................................ 2020-198263

(51) Int. Cl.
*B41J 2/045* (2006.01)
*B41J 2/14* (2006.01)

(52) U.S. Cl.
CPC ....... *B41J 2/04588* (2013.01); *B41J 2/04541* (2013.01); *B41J 2/04581* (2013.01); *B41J 2/0459* (2013.01); *B41J 2/14233* (2013.01)

(58) Field of Classification Search
CPC .................................................... B41J 2/40588
See application file for complete search history.

(56) References Cited

U.S. PATENT DOCUMENTS

2004/0169545 A1* 9/2004 Aiba .................... H10N 30/802 327/530
2009/0073205 A1* 3/2009 Liu ...................... B41J 2/04541 347/10
(Continued)

FOREIGN PATENT DOCUMENTS

JP H04133741 A 5/1992
JP H09123442 A 5/1997
(Continued)

*Primary Examiner* — Shelby L Fidler
(74) *Attorney, Agent, or Firm* — HAUPTMAN HAM, LLP

(57) ABSTRACT

In a head body, a head controller inputs individual signals to multiple recording elements that form dots. The individual signals each include a non-waveform signal and a driving waveform signal. The non-waveform signal is input to the recording element during non-driving and the potential thereof is held at a standby potential. The driving waveform signal is input to the recording element during driving, and the potential thereof transitions from the standby potential to one or more displacement potentials. The standby potential of the non-waveform signal input to at least one of the multiple recording elements is different from the standby potential of the non-waveform signal input to at least another one of the multiple recording elements.

13 Claims, 19 Drawing Sheets

(56) References Cited

U.S. PATENT DOCUMENTS

| | | | | |
|---|---|---|---|---|
| 2010/0103212 | A1* | 4/2010 | Tabata | B41J 2/04548 347/10 |
| 2013/0083109 | A1* | 4/2013 | Hibino | B41J 2/0454 347/11 |
| 2014/0071192 | A1* | 3/2014 | Uchino | B41J 2/04581 347/14 |
| 2020/0101727 | A1* | 4/2020 | Osanai | B41J 2/04563 |
| 2021/0291517 | A1* | 9/2021 | Kida | B41J 2/04596 |

FOREIGN PATENT DOCUMENTS

| | | | |
|---|---|---|---|
| JP | H09254383 | A | 9/1997 |
| JP | 2004153411 | A | 5/2004 |
| JP | 2007301757 | A | 11/2007 |
| JP | 2012187859 | A | 10/2012 |
| JP | 2013045821 | A | 3/2013 |
| WO | 2018186140 | A1 | 10/2018 |

* cited by examiner

1

RECORDING HEAD AND RECORDING DEVICE

RELATED APPLICATIONS

The present application is a National Phase of International Application Number PCT/JP2021/042990 filed Nov. 24, 2021, which claims the benefit of priority from Japanese Patent Application No. 2020-198263, filed on Nov. 30, 2020.

TECHNICAL FIELD

The present disclosure relates to a recording head and a recording device.

BACKGROUND OF INVENTION

A known recording device includes multiple recording elements that individually form multiple dots making up an image on a recording medium. For example, inkjet head printers and thermal head printers are examples of such a recording device. In an inkjet head printer, the recording elements are discharge elements. Each discharge element includes a nozzle that discharges ink and an actuator that applies pressure to the ink inside the nozzle. In a thermal head, each recording element is a heating unit that applies heat to thermal paper or ink film. The recording elements are driven by being input with a driving signal whose potential changes over time in the form of a waveform.

In such printers, there will be differences in the states of the dots such as the dot size between multiple recording elements. For example, in inkjet printers, factors responsible for such variations in states of the dots include errors in nozzle manufacture, differences in pressure between multiple nozzles due to the different positions of the nozzles relative to the flow channels that supply the ink, and variations in the voltages input to the actuators that apply pressure to the ink in the individual nozzles. Such differences in the states of dots will appear in the image as unintended shading (density spots), for example.

In Patent Literatures 1 and 2 listed below, a technique is proposed in which multiple recording elements are divided into multiple blocks (areas) for each prescribed number of recording elements and the driving conditions of the recording elements for each block are corrected in order to reduce density spots.

Although not a technique relating to the reduction of density spots, Patent Literature 3 listed below discloses a technique for stably discharging ink at high speed regardless of the temperature conditions. In this technique, a reference potential is varied in accordance with the temperature of the ink in driving signals in which the potential varies from the reference potential.

Although not a technique related to the reduction of density spots, Patent Literatures 4 to 6 listed below disclose techniques related to methods of generating driving signals. In these techniques, each recording element is selectively connected to multiple terminals that are held at multiple potentials. This allows the potential supplied to each recording element to change in the form of a waveform. In other words, driving signals to be input to each recording element are generated.

CITATION LIST

Patent Literature

Patent Literature 1: Japanese Unexamined Patent Application Publication No. 04-133741

Patent Literature 2: Japanese Unexamined Patent Application Publication No. 2012-187859

Patent Literature 3: International Publication No. 2018/186140

Patent Literature 4: Japanese Unexamined Patent Application Publication No. 9-123442

Patent Literature 5: Japanese Unexamined Patent Application Publication No. 2004-153411

Patent Literature 6: Japanese Unexamined Patent Application Publication No. 2007-301757

SUMMARY

In an aspect of the present disclosure, a recording head includes multiple recording elements and a drive controller. Each recording element is configured to form a dot that makes up an image. The drive controller is configured to input an operation signal to each of the recording elements. The operation signal includes a standby signal and a driving signal. The standby signal is input to each recording element during non-driving and the potential thereof is held at a standby potential. The driving signal is input to each recording element during driving and the potential thereof transitions from the standby potential to one or more displacement potentials. The standby potential of the standby signal input to at least one of the multiple recording elements is different from the standby potential of the standby signal input to at least another one of the multiple recording elements.

In an aspect of the present disclosure, a recording device includes multiple recording elements, a control signal output unit, and a drive controller. The recording elements are each configured to form a dot making up an image. The control signal output unit is configured to generate a control signal based on image data. The drive controller is configured to input an operation signal to each of the multiple recording elements based on the control signal. The operation signal includes a standby signal and a driving signal. The standby signal is input to each recording element during non-driving and the potential thereof is held at a standby potential. The driving signal is input to each recording element during driving and the potential thereof transitions from the standby potential to one or more displacement potentials. The standby potential of the standby signal input to at least one of the multiple recording elements is different from the standby potential of the standby signal input to at least another one of the multiple recording elements.

DESCRIPTION OF EMBODIMENTS

Figure 1A:
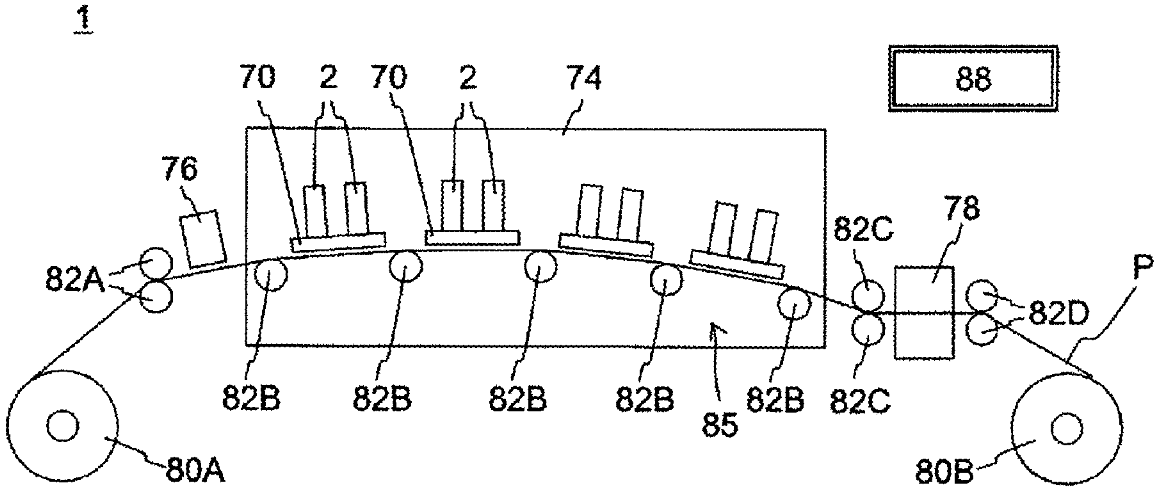
FIG. 1A is a side view schematically illustrating a recording device according to a First Embodiment.

Embodiments of the present disclosure are described below while referring to the drawings. The drawings used in the following description are schematic drawings, and the proportions of the dimensions and so forth in the drawings do not necessarily correspond to the actual proportions of the dimensions and so forth. Even in multiple drawings in which the same members are illustrated, the dimensional proportions might not match each other in order to exaggerate the shapes and so forth.

In the description of embodiments other than the First Embodiment, basically, only the differences from the previously described embodiments will be described. Matters not specifically mentioned may be assumed to be the same as or equivalent to those in the previously described embodiments.

FIRST EMBODIMENT

Overall Configuration of Printer

Figure 1B:
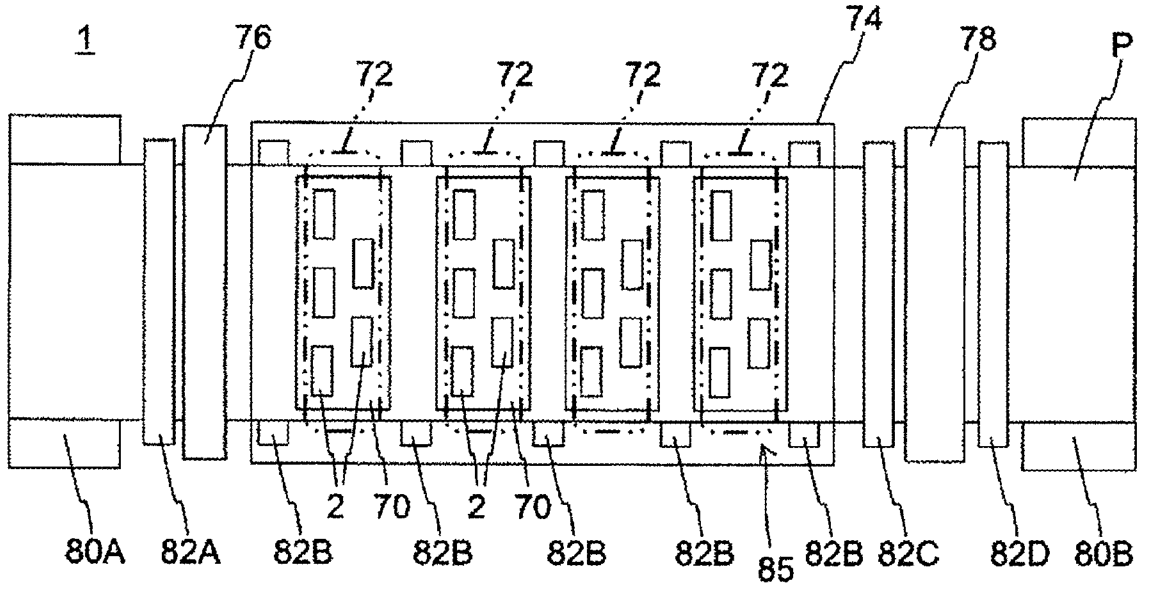
FIG. 1B is a plan view schematically illustrating the recording device according to the First Embodiment.

FIG. 1A is a schematic side view of a color inkjet printer 1 (may be simply referred to as a printer hereafter) as a recording device according to the First Embodiment. FIG. 1B is a schematic plan view of the printer 1. The printer 1 includes liquid discharge heads 2 (hereinafter, may be simply referred to as heads) as recording heads according to the First Embodiment.

The printer 1 conveys printing paper P, which is a recording medium, from a feeding roller 80A to a collecting roller 80B, and thereby moves the printing paper P relative to the heads 2. The feeding roller 80A and the collecting roller 80B, as well as various other rollers described below, make up a moving section 85 that causes the printing paper P and the heads 2 to move relative to each other. Based on print data, which is data such as images and characters, a control device 88 performs recording such as printing on the printing paper P by controlling the heads 2 in order to discharge liquid toward the printing paper P and deposit droplets on the printing paper P.

In this embodiment, the heads 2 are fixed to the printer 1, and the printer 1 is a so-called line printer. Another embodiment of a recording device may be a so-called serial printer. In a serial printer, for example, the heads 2 would be made to reciprocate in a direction that intersects a conveyance direction of the printing paper P, for example, in a substantially perpendicular direction. During this reciprocating motion, an operation of discharging droplets and conveying of the printing paper P are performed in an alternating manner.

In the printer 1, four flat head-mounting frames 70 (hereinafter may be simply referred to as "frames") are fixed in place so as to be substantially parallel to the printing paper P. Each frame 70 is provided with five holes, which are not illustrated, and five heads 2 are mounted in the holes. The five heads 2 mounted on one frame 70 make up one head group 72. The printer 1 includes four head groups 72, making a total of 20 heads 2.

The heads 2 mounted in the frames 70 are configured such that the parts of the heads 2 that discharge liquid face the printing paper P. The distance between each head 2 and the printing paper P is around 0.5 to 20 mm, for example.

The twenty heads 2 may be directly connected to the control device 88, or may be connected to the control device 88 via a distribution unit that distributes print data. For example, the control device 88 may send the print data to one distribution unit and the one distribution unit may distribute the print data to the twenty heads 2. For example, the control device 88 may distribute print data to four distribution units corresponding to the four head groups 72, and each distribution unit may then distribute the print data to the five heads 2 in the corresponding head group 72.

Each head 2 has an elongated long and narrow shape in a direction from front to back in FIG. 1A and in the vertical direction in FIG. 1B. Within a single head group 72, three heads 2 are arrayed along a direction that intersects, for example, is substantially perpendicular to, the conveyance direction of the printing paper P, and the other two heads 2 are arrayed at positions that are displaced along the conveyance direction so as to be positioned between the three heads 2. In other words, in one head group 72, the heads 2 are disposed in a staggered manner. The heads 2 are disposed so that the regions that can be printing on by the heads 2 are connected or overlap at their edges in the width direction of the printing paper P, i.e., a direction that intersects the conveyance direction of the printing paper P. This enables printing to be performed without the occurrence of gaps in the width direction of the printing paper P.

The four head groups 72 are disposed along the conveyance direction of the printing paper P. Each head 2 is supplied with liquid, for example, ink, from a liquid supply tank, which is not illustrated. The heads 2 belonging to one head group 72 are supplied with ink of the same color, and four colors of ink can be printed with the four head groups 72. The colors of ink discharged from the head groups 72 are, for example, magenta (M), yellow (Y), cyan (C), and black (K). Color images can be printed by printing these inks via control performed by the control device 88.

The number of heads 2 mounted in the printer 1 may be one head 2 if the printer 1 is monochromatic and prints a printable area with one head 2. The number of heads 2 included each head group 72 and/or the number of head groups 72 may be changed as appropriate depending on the object to be printed and/or printing conditions. For example, the number of head groups 72 may be increased in order to print a greater number of colors. If multiple head groups 72, which print in the same color, are disposed and made to print in an alternating manner in the conveyance direction, the conveyance speed can be increased even if heads 2 having the same performance are used. This allows a larger area to be printed per unit time. Multiple head groups 72, which print in the same color, may be prepared and disposed so as to be shifted from each other in a direction that intersects the conveyance direction in order to increase the resolution in the width direction of the printing paper P.

Furthermore, in addition to printing colored inks, a liquid, such as a coating agent, may be printed uniformly or in a pattern by the heads 2 in order to perform a surface treatment on the printing paper P. For example, a coating agent can be used to form a liquid receptive layer in order to make a liquid easier to fix in place when a recording medium that does not readily soak up liquid is used. Other coating agents can be used to form a liquid penetration inhibiting layer so that the liquid does not bleed too much or mix too much with another liquid that has been deposited next to it when using a recording medium that readily soaks up liquid. In addition to being printed using the heads 2, a coating agent may be applied uniformly by an applicator 76, which is controlled by the control device 88.

The printer 1 performs printing on the printing paper P, which is a recording medium. The printing paper P is wound around the feeding roller 80A. The printing paper P fed from the feeding roller 80A passes under the heads 2 mounted in the frames 70, then between two conveying rollers 82C, and is finally collected by the collecting roller 80B. When printing is being performed, the printing paper P is conveyed at a constant speed by rotating the conveying rollers 82C and printed on by the heads 2.

Next, details of the printer 1 will described in the order in which the printing paper P is conveyed. The printing paper P fed from the feeding roller 80A passes between the two guide rollers 82A and then under the applicator 76. The applicator 76 applies a coating agent as described above to the printing paper P.

The printing paper P next enters a head chamber 74, which houses the frames 70 in which the heads 2 are mounted. Although some parts of the head chamber 74 are connected to the outside, such as the places where the printing paper P enters and exits, the head chamber 74 is generally a space that is isolated from the outside. The head chamber 74 is controlled by the control device 88 or another device with respect to control factors such as temperature, humidity, and air pressure, as needed. In the head chamber 74, the range of variation of the control factors described above can be made smaller than outside, because the effects of disturbances can be reduced compared to outside where the printer 1 is installed.

Five guide rollers 82B are disposed in the head chamber 74, and the printing paper P is conveyed over the guide rollers 82B. The five guide rollers 82B are disposed so as to protrude outward at the center towards the direction in which the frames 70 are located when viewed from the side. As a result, the printing paper P being conveyed over the five guide rollers 82B has an arc-like when viewed from the side, and the printing paper P is stretched flat between the individual guide rollers 82B as a result of tension being applied to the printing paper P. One frame 70 is disposed between two guide rollers 82B. Each frame 70 is installed at a slightly different angle so as to be parallel to the printing paper P conveyed therebelow.

After exiting the head chamber 74, the printing paper P passes between two conveying rollers 82C, through the inside of a dryer 78, between two guide rollers 82D, and is then collected by the collecting roller 80B. The conveyance speed of the printing paper P is, for example, 100 m/min. Each roller may be controlled by the control device 88 or manually operated by a person.

As a result of the drying performed in the dryer 78, overlapping wound parts of the printing paper P are less likely to stick to each other or parts of undried liquid are less likely to rub against each other on the collecting roller 80B. In order to perform printing at high speed, drying also needs to be fast. In order to speed up the drying process, the dryer 78 may perform drying by using multiple drying methods in sequence or by using multiple drying methods together. Drying methods used in such cases may include, for example, blowing warm air, irradiation with infrared rays, and contact with heated rollers. When irradiating with infrared rays, infrared rays in a specific frequency range may be applied to the printing paper P so as to speed up the drying process while minimizing damage to the printing paper P. When the printing paper P is brought into contact with a heated roller, the printing paper P may be conveyed along the cylindrical surface of the roller so as to extend the time during which heat transfer occurs. The conveyance range along the cylindrical surface of the roller is preferably equivalent to at least ¼ of circumference the cylindrical surface of the roller, and more preferably equivalent to ½ or more of the circumference of the cylindrical surface of the roller. When printing UV-curable inks or the like, a UV radiation light source may be disposed instead of or in addition to the dryer 78. The UV radiation source may be disposed between the frames 70.

The printer 1 may include a cleaning section that cleans the heads 2. The cleaning section performs cleaning by performing wiping and/or capping, for example. Wiping is performed, for example, by using a flexible wiper to scrape the surface of the area from which the liquid is discharged, for example, a facing surface 3*a* (described later), so as to remove any liquid adhering to that surface. Capping cleaning is performed in the following manner, for example. First, a cap is placed over the area from which the liquid is discharged, for example, the facing surface 3*a* (this is called capping), so that a substantially sealed space is created between the facing surface 3*a* and the cap. In such a state, discharging of liquid is repeatedly performed in order to remove any liquid that has become clogged in nozzles 5 (described later), which has a higher viscosity than the standard state, and/or foreign matter, and so on. Capping makes liquid less likely to splash into the printer 1 during cleaning and to adhere to the printing paper P or conveying mechanisms such as rollers. Once the facing surface 3*a* has been cleaned, the facing surface 3*a* may be additionally wiped. Cleaning by wiping and/or capping may be performed manually by a person operating the wipers and/or caps attached to the printer 1, or may be performed automatically by the control device 88.

In addition to the printing paper P, the recording medium may be a roll of cloth or another medium. Instead of conveying the printing paper P directly, the printer 1 may directly convey a conveyor belt and the recording medium may be conveyed by placing the recording medium on the conveyor belt. Thus, sheet paper, cut cloth, wood, or tiles may be used as the recording medium. In addition, a liquid containing electrically conductive particles may be discharged from the heads 2 in order to print wiring lines and so on of electronic devices.

The printer 1 may be equipped with a position sensor, a velocity sensor, a temperature sensor, and so on, and the control device 88 may control each part of the printer 1 in accordance with the status of each part of the printer 1 as determined from information from the sensors. For example, if the temperature of any of the heads 2, the temperature of the liquid in the liquid supply tank that supplies liquid to the heads 2, and/or the pressure applied to the heads 2 by the liquid in the liquid supply tank affects the discharge characteristics of the discharged liquid, i.e., the discharge volume and/or discharge velocity, and so on, the driving signal for causing the liquid to be discharged may be changed in response to such information on the discharge characteristics.

Hereafter, for convenience, the description basically focuses on one head 2. Therefore, for example, hereafter, when "all the nozzles" are referred to, this means all the nozzles in one head 2 unless otherwise noted. When "all the nozzles" are referred to, specific nozzles may be treated as being different from those specified by the term "all the nozzles", unless otherwise noted. For example, dummy nozzles that do not discharge droplets may be provided further towards the outside than the nozzles located at edges of the head 2 in order to make the discharge characteristics of the nozzles located at the edges of the head 2 closer to those of the nozzles located at the center of the head 2. Such dummy nozzles do not need to be included in the case where the term "all the nozzles" is used. This similarly applies to components other than the nozzles.

Head

Figure 2A:
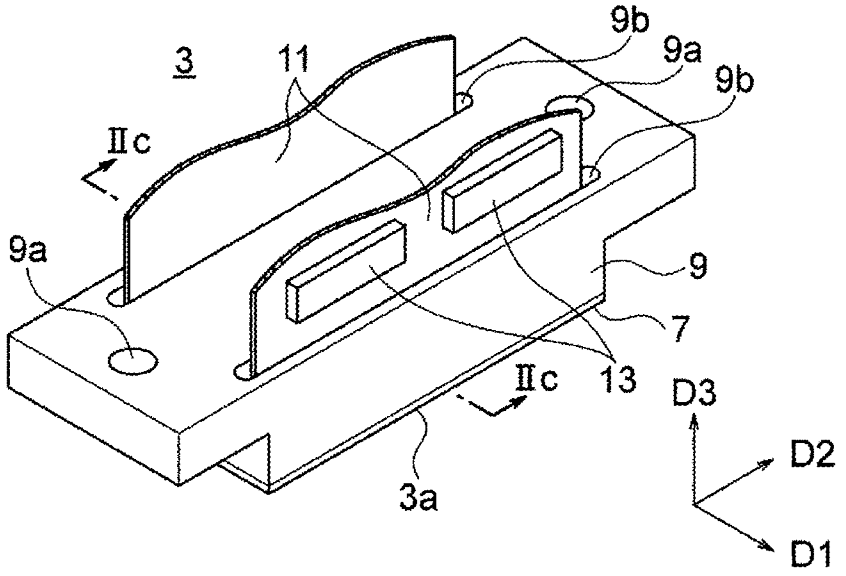
FIG. 2A is a perspective view of a liquid discharge head according to the First Embodiment.
Figure 2B:
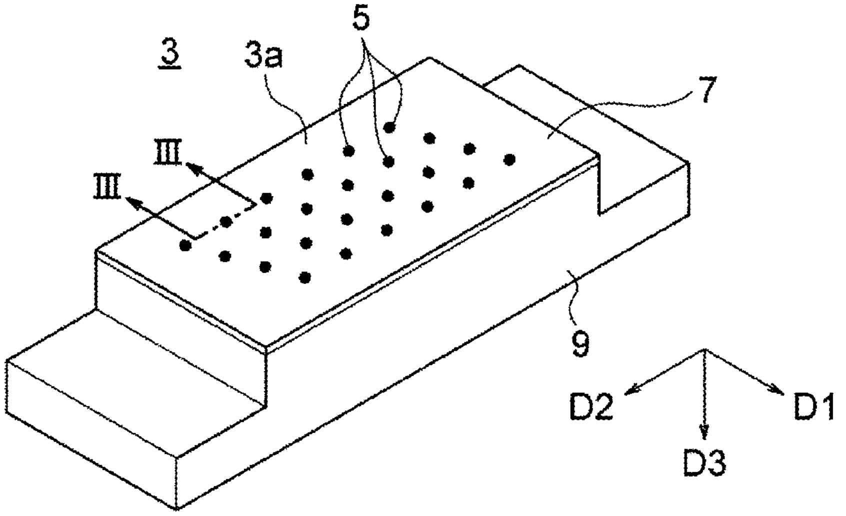
FIG. 2B is another perspective view of the liquid discharge head according to the First Embodiment.
Figure 2C:
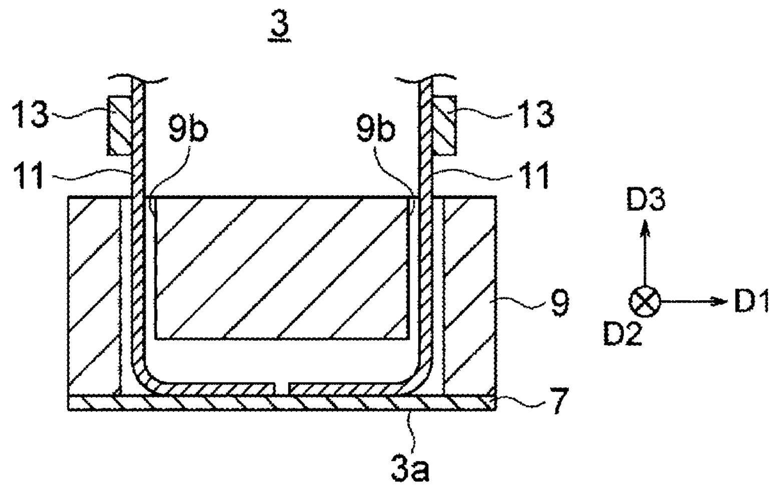
FIG. 2C is a sectional view taken along line IIc-IIc in FIG. 2A.

FIG. 2A is a perspective view of a head body 3 of the head 2 as viewed from the opposite side from the side where the recording medium (printing paper P) would be located. FIG. 2B is a perspective view of the head body 3 as viewed from the side where the recording medium would be located. FIG. 2C is a sectional view taken along line IIc-IIc in FIG. 2A.

A Cartesian coordinate system consisting of D1, D2, and D3 axes and so on is depicted in these figures for convenience. The D1 axis is defined as being parallel to the direction of relative movement between the head body 3 and the recording medium (conveyance direction of printing paper P in FIG. 1A). The relationship between the positive and negative sides of the D1 axis and the direction of travel of the recording medium relative to the head body 3 does not particularly matter in the description of this embodiment. The D2 axis is defined as being parallel to the recording medium and perpendicular to the D1 axis. The positive and negative sides of the D2 axis do also not particularly matter here. The D3 axis is defined as being perpendicular to the recording medium. The −D3 side is assumed to be the side located in a direction from the head body 3 towards the recording medium. The head body 3 may be used with either direction being regarded as up or down, but for convenience, the +D3 side may be regarded as corresponding to up, and terms such as a "lower surface" may be used.

One head 2 includes one head body 3. The head body 3 is the part that is directly responsible for discharging liquid and has the facing surface 3*a* that faces the recording medium. Multiple nozzles 5 for discharging liquid are formed in the facing surface 3*a*. In addition to the head body 3, the head 2 may further include, for example, a circuit board connected to the head body 3 and/or a housing covering the top of the head body 3. Regardless of whether or not the head 2 includes any components other than the head body 3, the head body 3 may be regarded as being a head according to an embodiment of the present disclosure.

The multiple nozzles 5 are disposed at different positions in the D2 direction. Therefore, a desired two-dimensional image is formed by discharging ink drops from the multiple nozzles 5 while the moving section 85 moves the head 2 and the recording medium relative to each other in the D1 direction. The multiple nozzles 5 may be disposed in a two-dimensional arrangement, as in the illustrated example, or may be disposed in a one-dimension arrangement, unlike in the illustrated example.

The specific size, number, pitch, and arrangement pattern of the multiple nozzles 5 may be set as appropriate. FIG. 2B is a schematic diagram, and therefore the nozzles 5 are illustrated as being large relative to the size of the head body 3, and the number of nozzles 5 in one head body 3 is illustrated as being small. Generally, the nozzles 5 would be smaller in size and greater in number than in the illustrated example. For example, in one head body 3, the number of nozzles 5 may be greater than or equal to 100 and less than or equal to 10000. For example, one head body 3 may include multiple nozzles 5 having a pitch and arrangement pattern such that the dot density in the D2 direction is 800 dpi or higher and 1600 dpi or lower.

The configuration of the multiple nozzles 5 and the components provided for each of the multiple nozzles 5 (for example, an actuator 17 and an element control circuit 51 described later) are basically the same for the multiple nozzles 5. Unless stated otherwise, the description given for one nozzle 5 or a configuration corresponding to one nozzle 5 may also be applied to the other nozzles 5.

The head body 3 includes, for example, the following components. A facing substrate 7, which has the facing surface 3*a*. A rear member 9, which is fixed above the facing substrate 7. One or more (two in the illustrated example) flexible substrates 11, which are electrically connected to the facing substrate 7. One or more (two in the illustrated example) integrated circuits (ICs) 13 mounted on each flexible substrate 11.

The facing substrate 7 directly contributes to discharging of droplets. As described in detail later, the facing substrate 7 includes flow channels leading to the multiple nozzles 5 and actuators that apply pressure to the liquid inside the multiple nozzles 5. The shape, size, and so forth of the facing substrate 7 may be set as appropriate. In the illustrated example, the facing substrate 7 has a substantially rectangular flat plate-like shape. The thickness (in the D3 direction) is, for example, 0.5 mm or more and 2 mm or less.

The rear member 9, for example, serves as an intermediary between the facing substrate 7 and other components. For example, the rear member 9 helps position the facing substrate 7 relative to the frame 70 described above. Specifically, for example, the bottom surface of the rear member 9 is bonded to an outer edge portion of the top surface of the facing substrate 7, and an upper flange-like portion of the rear member 9 is supported by the frame 70 while a lower portion of the rear member 9 is inserted into a hole in the frame 70. For example, the rear member 9 serves as an intermediary between an ink tank (not illustrated) and the facing substrate 7 with respect to ink flow. Specifically, the rear member 9 has openings 9*a* in the top surface thereof and openings, which are not illustrated, in the bottom surface thereof, which is bonded to the facing substrate 7. The openings in the top surface are connected to the openings in the bottom surface by flow channels, which are not illustrated, inside the rear member 9. The openings 9*a* are connected to the ink tank via tubes and so on, which are not illustrated.

The flexible substrates 11 contribute to the electrical connections between the facing substrate 7 and the control device 88. Specifically, for example, the flexible substrates 11 are inserted into slits 9*b*, which penetrate vertically through the rear member 9. The portions of the flexible substrates 11 that extend downward from the slits 9*b* are disposed so as to face the top surface of the facing substrate 7 and are bonded to the top surface of the facing substrate 7 by conductive bumps (for example, solder), which are not illustrated. The portions of the flexible substrates 11 that extend upward from the slits 9*b* are connected to a cable, which is not illustrated, extending from the control device 88 via connectors mounted on those portions or on a rigid substrate that is connected to the flexible substrates 11.

The ICs 13, for example, contribute to driving and control of the actuators, which are described later, of the facing substrate 7. Specifically, for example, the ICs 13 are input with control signals from the control device 88 via the flexible substrates 11, generate driving power (or, from another perspective, signals) based on the input control signals, and input the generated driving power to the actuators of the facing substrate 7 via the flexible substrates 11. The shape, size, number, positions, and so on of the ICs 13 may be set as appropriate.

Configuration of Recording Element

Figure 3:
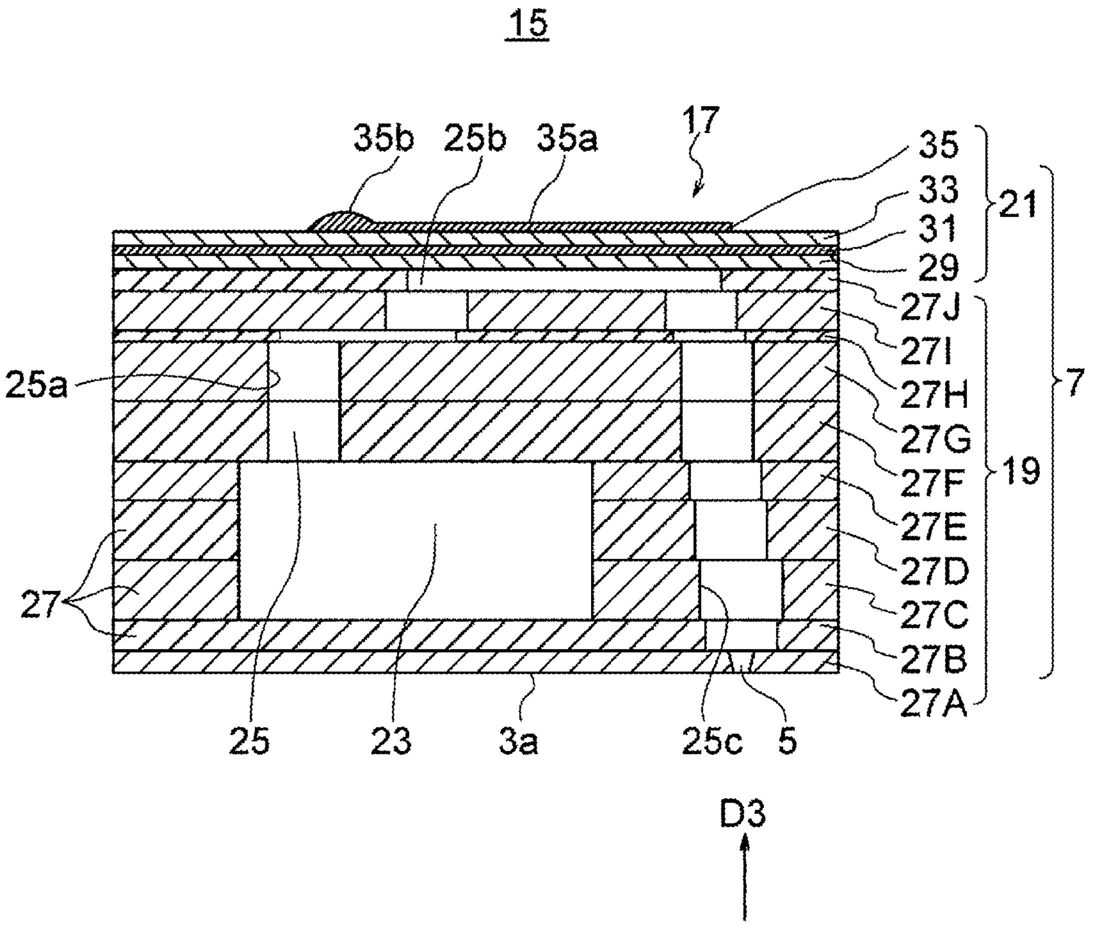
FIG. 3 is a sectional view taken along line III-III in FIG. 2A.

FIG. 3 is a sectional view taken along line III-III in FIG. 2B. In other words, FIG. 3 is a schematic sectional view illustrating a portion of the facing substrate 7 in an enlarged manner. As is clear from the orientation of the D3 axis, the upper side of the illustration in FIG. 3 corresponds to the lower side of the illustration in FIG. 2B.

The facing substrate 7 includes multiple recording elements 15 (discharge elements) provided for the individual nozzles 5. In FIG. 3, one recording element 15 is illustrated. The multiple recording elements 15 are disposed two-dimensionally (or one-dimensionally) along the facing surface 3*a*, similarly to the multiple nozzles 5. Each recording element 15 includes the nozzle 5 and the actuator 17 that applies pressure to the liquid inside the nozzle 5. The actuator 17 is a piezoelectric type actuator that applies pressure to the ink via mechanical strain of a piezoelectric material.

In another aspect, the facing substrate 7 includes a plate-shaped flow channel member 19 in which flow channels along which liquid (ink) flows are formed, and an actuator substrate 21 for applying pressure to the liquid inside the flow channel member 19. Multiple nozzles 5 are formed in the flow channel member 19. Multiple actuators 17 are formed in the actuator substrate 21. In other words, multiple recording elements 15 are constituted by the flow channel member 19 and the actuator substrate 21.

The flow channel member 19 includes a common flow channel 23 and multiple individual flow channels 25 (one is illustrated in FIG. 3), each connected to the common flow channel 23. Each individual flow channel 25 includes a nozzle 5, and also includes a connection flow channel 25*a*, a pressurization chamber 25*b*, and a partial flow channel 25*c* (descender), in this order from the common flow channel 23 to the nozzle 5. The pressurization chamber 25*b* is open at a surface of the flow channel member 19 on the opposite side from the facing surface 3*a*. The partial flow channel 25*c* extends from the pressurization chamber 25*b* towards the facing surface 3*a*. The nozzle 5 is open at a bottom surface of the partial flow channel 25*c*. The specific shape and size of each flow channel may be set as appropriate.

The multiple individual flow channels 25 and the common flow channel 23 are filled with liquid. As the volumes of the multiple pressurization chambers 25*b* change and pressure is applied to the liquid, the liquid is delivered from the multiple pressurization chambers 25*b* to the multiple partial flow channels 25*c*, and multiple droplets are discharged from the multiple nozzles 5. The multiple pressurization chambers 25*b* are replenished with liquid from the common flow channel 23 via the multiple connection flow channels 25*a*.

The flow channel member 19 has, for example, a configuration in which multiple plates 27A to 27J (A to J may be omitted hereafter) are stacked on top of one another. Multiple holes (mainly through holes, but recesses may also be included) are formed in the plates 27. The holes constituting the multiple individual flow channels 25 and the common flow channel 23. The thickness and the number of the multiple plates 27 may be set as appropriate in accordance with the shapes and so forth of the multiple individual flow channels 25 and the common flow channel 23. The multiple plates 27 may be formed of any suitable material. For example, the multiple plates 27 are formed of a metal or resin. The thickness of the plates 27 is, for example, greater than or equal to 10 μm and less than or equal to 300 μm.

The actuator substrate 21 has a substantially plate-like shape that is sufficiently wide to span across the multiple pressurization chambers 25*b*. The actuator substrate 21 consists of a so-called unimorph piezoelectric actuator. The actuator substrate 21 may consist of another type of piezoelectric actuator such as a bimorph piezoelectric actuator. The unimorph actuator substrate 21 (actuator 17), for example, includes a vibration plate 29, a common electrode 31, a piezoelectric layer 33, and individual electrodes 35, in this order from the side where the flow channel member 19 is located.

The vibration plate 29, the common electrode 31, and the piezoelectric layer 33, for example, extend across multiple pressurization chambers 25*b* in plan view. In other words, these layers are shared by multiple pressurization chambers 25*b*. The individual electrodes 35 are respectively provided for the pressurization chambers 25*b*. Each individual electrode 35 includes a body 35*a* that overlaps the corresponding pressurization chamber 25*b* and a lead-out electrode 35*b* that extends from the body 35*a*. The body 35*a*, for example, has a shape and size substantially the same as the shape and size of the pressurization chamber 25*b*.

The specific material and thickness of each layer may be set as appropriate. For example, the material of the piezoelectric layer 33 may be a ceramic such as lead zirconate titanate (PZT). The material of the vibration plate 29 may be a ceramic that does or does not exhibit piezoelectricity. The common electrode 31 and the individual electrodes 35 may be composed of a metal such as a Ag-based or Au-based metal. The thickness of the vibration plate 29 and the thickness of the piezoelectric layer 33 may each be greater than or equal to 10 μm and less than or equal to 40 μm. The thickness of the common electrode 31 may be greater than or equal to 1 μm and less than or equal to 3 μm. The thickness of each individual electrode 35 may be greater than or equal to 0.5 μm and less than or equal to 2 μm.

Out of the piezoelectric layer 33, at least the portion sandwiched between the body 35*a* of each individual electrode 35 and the common electrode 31 is polarized in the thickness direction. Thus, for example, when an electric field (voltage) is applied in the direction of polarization of the piezoelectric layer 33 by the body 35*a* and common electrode 31, the piezoelectric layer 33 contracts in a direction along the layer. This contraction is restricted by the vibration plate 29. As a result, the actuator 17 bends and deforms in a convex manner towards the pressurization chamber 25*b*. When an electric field (voltage) is applied in the opposite direction from that mentioned above by the body 35*a* and the common electrode 31, the actuator 17 bends and deforms towards the side opposite from the side where the pressurization chamber 25*b* is located. By using such bending deformation, the volume of the pressurization chamber 25*b* can be changed as described above, pressure can be applied to the ink inside the pressurization chamber 25*b*, and ink can be discharged from the nozzle 5.

The common electrode 31, for example, is supplied with a potential that is constant with the passage of time during printing. The constant potential is, for example, a reference potential. On the other hand, the individual electrodes 35, for example, are input with a signal whose potential changes with the passage of time. This changes the intensity of the electric field applied to the piezoelectric layer 33. In turn, this can cause the actuators 17 to bend and deform, as described above. The bending deformation of multiple actuators 17 can be individually controlled by individually inputting multiple signals to multiple individual electrodes 35. In turn, the amount of droplets ejected from multiple nozzles 5 can be individually controlled in accordance with the content of the image intended to be printed.

The actuators 17 may be connected to an external controller (for example, ICs 13) as appropriate. For example, the flexible substrates 11 are disposed so as to face the top surface of actuator substrate 21. Pads, which are not illustrated, of the flexible substrates 11 are bonded to the edges of the lead-out electrodes 35*b* via conductive bumps. As a result, the individual electrodes 35 and the ICs 13 are connected to each other via signal lines, which are not illustrated, of the flexible substrates 11. Thus, signals can be input to the individual electrodes 35 from the ICs 13.

Although not specifically illustrated, the actuator substrate 21 includes via conductors at appropriate positions in plan view that penetrate through the piezoelectric layer 33, are connected to the common electrode 31, and are exposed at the top surface of the piezoelectric layer 33. Pads, which are not illustrated, on the flexible substrates 11 are connected to the via conductors via conductive bumps. In this way, for example, the common electrode 31 is connected to reference potential wiring lines, which are not illustrated, of the flexible substrates 11. Thus, a reference potential can be supplied to the common electrode 31.

Signals Input to Individual Electrodes

As described above, the actuators 17 (more specifically, the individual electrodes 35) are input with signals whose potential varies in the form of a waveform. The waveform of a signal may take any of various known forms. One example is illustrated hereafter. For convenience, in the description of this embodiment, the waveform of a signal illustrated here may be assumed.

Figure 4:
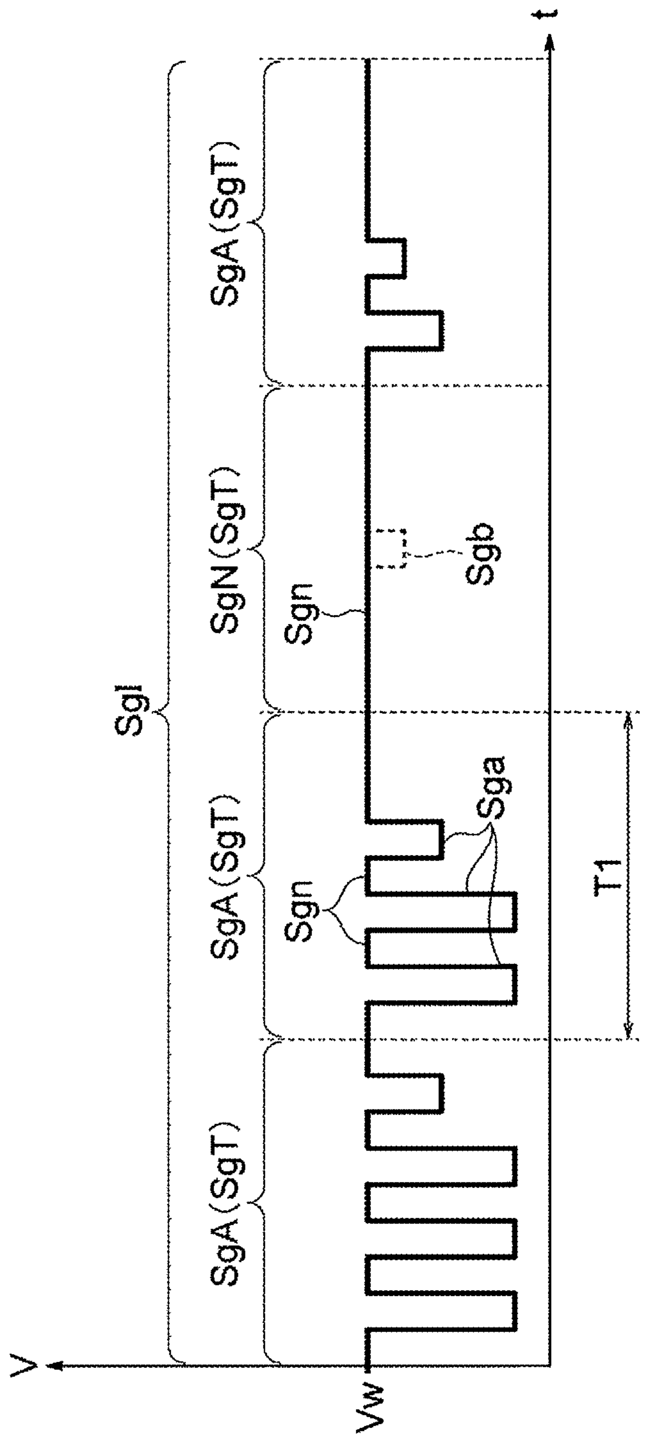
FIG. 4 is a schematic diagram illustrating an example of the waveform of an individual signal input to an actuator of the liquid discharge head according to the First Embodiment.

FIG. 4 is a schematic diagram illustrating an example of the waveform of an individual signal SgI input to each individual electrode 35 when an image is printed by the printer 1. In this figure, the horizontal axis represents time t and the vertical axis illustrates a potential V of the individual signal SgI.

The individual signal SgI is, for example, a signal that is input to each individual electrode 35 over a period of time during which one image is printed. The individual signal SgI includes periodic signals SgT (SgA and SgN) that are input to the individual electrodes 35 every prescribed period T1. The periodic signals SgT are, for example, signals corresponding to the formation of one dot on the recording medium (printing paper P). The period T1 is, for example, a time period during which the recording medium (printing paper P) and the head 2 travel a distance corresponding to one pitch of dots formed on the recording medium in the direction of relative movement between the recording medium and the head 2 (direction D1 in FIG. 2).

The multiple periodic signals SgT include, for example, a driving periodic signal SgA, which is input to the individual electrodes 35 when forming dots on the recording medium, and a non-driving periodic signal SgN, which is input to the individual electrodes 35 when not forming dots on the recording medium.

The driving periodic signal SgA contains, for example, one or more driving waveform signals Sga. The driving waveform signal Sga is a signal whose potential changes with the passage of time with respect to a prescribed standby potential Vw. When the driving waveform signal Sga is input to an individual electrode 35, the intensity of the electric field between the individual electrode 35 and the common electrode 31 changes, and a droplet is discharged from the nozzle 5 as described above.

On the other hand, the non-driving periodic signal SgN is, for example, a signal whose potential is maintained at the standby potential Vw (in other words, a constant potential) over the period T1. Therefore, the intensity of the electric field between the individual electrode 35 and the common electrode 31 does not change, and no droplet is ejected from the nozzle 5.

The standby potential Vw may be higher, identical to, or lower than the potential of the common electrode 31. The potential of the driving waveform signal Sga may decrease (as in the illustrated example) and/or increase relative to the standby potential Vw. These parameters may be set in accordance with the driving method used for the actuators 17.

The printer 1 (head 2) may be capable of forming two or more different types of driving periodic signals SgA whose waveforms (more precisely, the magnitude and temporal arrangement of the displacement potential as described below) differ from each other, or may be capable of forming only one type of driving periodic signal SgA. In the former case, the printer 1 can form multiple types of dots that differ in size from each other. In other words, the printer 1 can print images with desired shading, such as grayscale images. In the latter case, the printer 1 forms only one type of dot having a constant size. In other words, the printer 1 can print images that do not have desired shading, such as monochrome images.

In a case where two or more types of driving periodic signals SgA are formed, the manner of the differences therebetween may be chosen as appropriate. From another perspective, in one driving periodic signal SgA, the manner in which the driving waveform signal Sga changes in accordance with shading may be chosen as appropriate.

For example, the number of driving waveform signals Sga within one driving periodic signal SgA may be increased or decreased. In this case, for example, one driving waveform signal Sga corresponds to one droplet. The number of droplets discharged in the period T1 (the number of droplets forming one dot) is increased or decreased by increasing or decreasing the number of driving waveform signals Sga. Multiple droplets forming one dot may be joined together or separated from each other on the recording medium.

In addition to or instead of increasing or decreasing the number of driving waveform signals Sga, the amplitudes of the driving waveform signals Sga may be increased or decreased. The amplitude is, from another perspective, the potential farthest away from the standby potential Vw of the driving waveform signal Sga, which is the lowest potential in the illustrated example. In this case, for example, the size of a single droplet is increased or decreased by increasing or decreasing the amplitude.

Although not specifically illustrated, the specific shape of the driving waveform signal Sga may be adjusted. For example, the slopes of the fall and rise of the potential may be adjusted. The time period for which the potential farthest away from the standby potential Vw is maintained may be adjusted.

Changes in the waveform of the driving periodic signal SgA as described above may be realized, for example, by selecting the driving periodic signal SgA that is to be actually input to each individual electrode 35 from among multiple candidate driving periodic signals. The multiple candidate driving periodic signals differ from each other in terms of at least one out of the number, the amplitude (potential), and the shape of the driving waveform signals Sga, for example, as may be understood from the above description. In cases such as where the number of driving waveform signals Sga included in one driving periodic signal SgA is constant, the selection of a driving periodic signal SgA from among multiple candidate driving periodic signals may be regarded as being the selection of driving waveform signals Sga from among multiple candidate driving waveform signals.

The driving periodic signal SgA may or may not include a non-waveform signal Sgn whose potential is maintained at the standby potential Vw at the beginning and/or end of the period T1 (as in the illustrated example). In a case where the driving periodic signal SgA can include two or more driving waveform signals Sga, the driving periodic signal SgA may include a non-waveform signal Sgn between adjacent driving waveform signals Sga (as in the illustrated example). The signals between adjacent driving waveform signals Sga may have a potential that is different from the standby potential Vw.

The potential of the non-driving periodic signal SgN may, for example, be maintained at the standby signal Vw over the period T1, as described above. In other words, the non-driving periodic signal SgN may consist entirely of the above non-waveform signal Sgn.

As illustrated in FIG. 4 by a dotted line, the non-driving periodic signal SgN may include a non-driving waveform signal Sgb whose potential varies from the standby potential Vw. Such a non-driving waveform signal Sgb, for example, adds a pressure fluctuation to the ink inside the nozzle 5 of a magnitude such that droplets are not discharged. As a result, for example, the probability of ink congealing inside nozzle 5 is reduced and/or an amount of ink equivalent to the amount of ink that has evaporated is replenished to the nozzle 5.

Overview of Driving Waveform Signal

As mentioned above, the standby potential Vw and the potentials of the driving waveform signals Sga may be set as appropriate in accordance with the driving method used for the actuators 17. The specific shapes of the driving waveform signals Sga may also be set as appropriate. One example is illustrated hereafter.

Here, a mode where the driving method of the actuators 17 is a so-called "pull-push method" will be taken as an example. In addition, a case where the polarization direction of the piezoelectric layer 33 is from the individual electrodes 35 to the common electrode 31 will be taken as an example. In this case, for example, when a potential higher than the potential of the common electrode 31 is applied to a particular individual electrode 35, the actuator 17 will bend toward the pressurization chamber 25*b*. For convenience, in the description of this embodiment, the driving method and the waveform of a signal illustrated here may be assumed.

Figure 5:
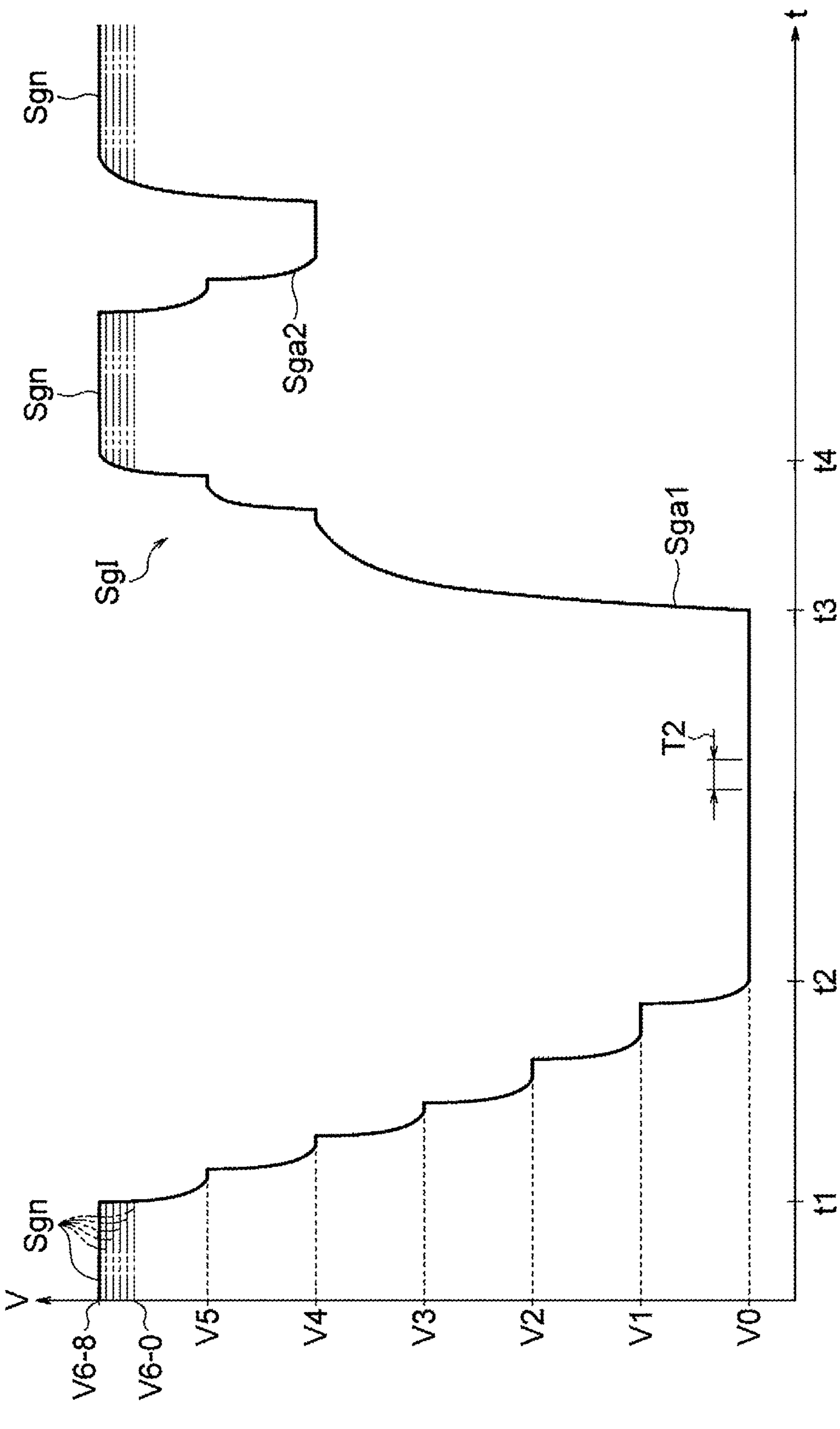
FIG. 5 is an enlarged view of part of FIG. 4.

FIG. 5 is an enlarged view of part of FIG. 4. This figure may be regarded as, for example, an illustration of the entirety (or the entirety and the surrounding region) of one driving periodic signal SgA in a mode where the number of driving waveform signals Sga within one driving periodic signal SgA does not increase or decrease. The figure may alternatively be regarded as, for example, an illustration of a portion of one driving periodic signal SgA in a mode where the number of driving waveform signals Sga in one driving periodic signal SgA increases or decreases.

In FIG. 5, multiple types of non-waveform signals Sgn (from another perspective, multiple types of standby potentials Vw: V6_8, and so on) are represented by one solid line and multiple double-dashed lines. Here, only one non-waveform signal Sgn (standby potential V6_8), which is represented by a solid line, is focused upon. The standby potential Vw is higher than the potential of the common electrode 31 (for example, the reference potential).

In FIG. 5, a first driving waveform signal Sga1 and a subsequent second driving waveform signal Sga2 are illustrated as driving waveform signals Sga. Both these signals are signals whose potential changes (more specifically, falls) from the standby potential Vw and then returns to the standby potential Vw.

Before time t1, the individual signal SgI is the non-waveform signal Sgn. In other words, the individual electrode 35 is supplied with a standby potential Vw higher than the potential of the common electrode 31. As a result, the actuator 17 bends towards the pressurization chamber 25*b*.

At time t1, input of the first driving waveform signal Sga1 begins. As a result, the potential of the individual electrode 35 falls. Then, at time t2, the potential of individual electrode 35 reaches its lowest point. The fall in the potential of the individual electrode 35 causes the actuator 17 to begin to return to its original shape (for example, a flat shape) and the volume of the pressurization chamber 25*b* increases. As a result, a negative pressure is applied to the liquid inside the pressurization chamber 25*b*. The liquid inside the pressurization chamber 25*b* then begins to vibrate with a natural vibration period. The volume of the pressurization chamber 25*b* then reaches its maximum and the pressure is almost zero. Then, the volume of the pressurization chamber 25*b* begins to decrease and the pressure increases.

At time t3, the potential of the individual electrode 35 begins to increase. At time t4, input of the first driving waveform signal Sga1 ends and input of the non-waveform signal Sgn begins. The rise in the potential of the individual electrode 35 causes the actuator 17 to begin to bend towards the pressurization chamber 25*b* again. The vibration applied initially overlaps with the subsequently applied vibration, and a greater pressure is applied to the liquid. This pressure propagates through the partial flow channel 25*c* and causes the liquid to be discharged from the nozzle 5.

In other words, droplets can be discharged by supplying the low-potential first driving waveform signal Sga1 to the individual electrode 35 for a certain period of time with the standby potential Vw serving as a reference. When the pulse width of the first driving waveform signal Sga1 (t2 to t3 or t1 to t4) is set to be half the time of the natural vibration period of the liquid inside the pressurization chamber 25*b*, i.e., the acoustic length (AL), the liquid discharge speed and discharge volume are maximized in principle.

In reality, the pulse width may be set to a value around 0.5 AL to 1.5 AL, since there are other factors to consider, such as ensuring the discharged droplets combine into one droplet. The discharge volume can be reduced by setting the pulse width to a value that deviates from the AL, and therefore the pulse width may be set to a value deviating from the AL in order to reduce the discharge volume.

The second driving waveform signal Sga2 causes the inside of the pressurization chamber 25*b* to temporarily have a negative pressure at a timing when droplets are discharged from the nozzle 5. Thus, the ink discharged from the nozzle 5 is more likely to be torn away from the ink inside the nozzle 5. Thus, the accuracy of droplet size can be improved. The second driving waveform signal Sga2 may be omitted. In the following description, the expression "the presence of the second driving waveform signal Sga2 is ignored" may be used. In the following description, descriptions relating to the first driving waveform signal Sga1 may be applied to the second driving waveform signal Sga2 as long as there are no contradictions.

Displacement Potential of Driving Waveform Signal

A driving waveform signal Sga (or driving periodic signal SgA from another perspective) can be regarded as a signal whose potential transitions from the standby potential Vw to one or more displacement potentials (V0 to V5) that are different from (for example, lower than) the standby potential Vw. The number, magnitude, and temporal arrangement of the displacement potentials, to which the potential transitions, may be set as appropriate in one driving waveform signal Sga. In other words, the specific shape of the waveform of the driving waveform signal Sga may be set as appropriate.

The temporal arrangement of displacement potentials is a concept that includes, for example, the number of displacement potentials included in the driving waveform signal Sga, as well as the beginning and end (and thus the time lengths) of each displacement potential. The beginning and end of a displacement potential may be based on the time during which the potential is actually held at the displacement potential, or on the timing of a switch that switches the displacement potential (described later).

In the illustrated example, the first driving waveform signal Sga1 has a waveform resembling a multi-level digital signal in which the potential changes in a step-like manner with multiple displacement potentials set as the displacement potentials to which the potential transitions. In other words, the potential of the first driving waveform signal Sga1 transitions to multiple displacement potentials (more precisely, six displacement potentials V0 to V5) in sequence. Unlike the illustrated example, the driving waveform signal Sga may, for example, have a waveform resembling a binary digital signal by setting only one displacement potential as the displacement potential to which the potential transitions.

In another aspect, in the illustrated example, in the first driving waveform signal Sga1, there are time periods where the potential is maintained at each of the multiple displacement potentials, and a result, the first driving waveform signal Sga1 has a waveform resembling a multi-value (or binary) digital signal. Unlike in the illustrated example, the first driving waveform signal Sga1 may have a waveform substantially resembling a binary digital signal by making the time for which the potential is maintained at each of the multiple displacement potentials at the falling and rising edges very short. Furthermore, the first driving waveform signal Sga1 may have a waveform substantially resembling an analog signal by making the time for which the potential is maintained at a displacement potential very short for all the displacement potentials.

In one first driving waveform signal Sga1, the number of displacement potentials, the magnitude of each displacement potential, and the potential difference between temporally successive displacement potentials and the temporal arrangement of the displacement potentials may be set as desired. At least one of these parameters may be different (as in the illustrated example) or the same for the falling edge and the rising edge in the first driving waveform signal Sga1. In this embodiment, "potential difference" refers to the absolute value unless otherwise noted (the same applies to potential differences for other potentials.)

In the illustrated example, in one first driving waveform signal Sga1, all the displacement potentials are positioned on one side in the vertical axis direction (low potential side in the illustrated example) relative to the standby potential Vw. However, multiple displacement potentials may be positioned on both sides in the vertical axis direction relative to the standby potential Vw.

In the above description, driving waveform signals Sga having different forms from each other (for example, multi-level digital signals and binary digital signals) were mentioned. Driving waveform signals Sga that have different forms from each other may exist when focusing on different types of heads. Driving waveform signals Sga having different forms from each other as described above may also exist when focusing on multiple types of driving waveform signals Sga that are generated to realize shading with one head.

As already mentioned, the amplitude of the first driving waveform signal Sga1 (the potential farthest away from the standby potential Vw) may be increased or decreased in order to achieve shading for dots on the recording medium. The potential that is farthest away from the standby potential Vw (the lowest potential in the illustrated example) may be selected from among multiple candidate displacement potentials (for example, six candidate displacement potentials V0 to V5) that differ in magnitude (potential) from each other. For example, in the example in FIG. 5, the candidate displacement potential V0 is selected as the potential farthest away from the standby potential Vw.

As already mentioned, the shape of the first driving waveform signal Sga1 may be adjusted in order to achieve shading for the dots on the recording medium. The displacement potential at which the potential is temporarily held at the falling or rising edge may be selected from among multiple candidate displacement potentials V0 to V5. The shape of the first driving waveform signal Sga1 may then be adjusted based on the magnitude of the selected candidate displacement potential and/or the length of time for which the potential is maintained at the selected candidate displacement potential. For example, in the illustrated example, all the candidate displacement potentials V0 to V5 are selected in descending order of potential at the falling edge, whereas only the candidate displacement potentials V4 and V5 are selected at the rising edge.

Multiple candidate displacement potentials may be used for a combination of the above two methods of use. Even in a mode where shading for the dots on the recording medium is realized by only increasing or decreasing driving waveform signals Sga contained in one driving periodic signal SgA, the driving waveform signal Sga may be configured by selecting one or more displacement potentials to which the potential transitions from among multiple candidate displacement potentials.

All candidate displacement potentials are used is usually assumed. However, there may be candidate displacement potentials that are not used. For example, if the ICs 13 are generic products that can be used for different types of heads, the multiple candidate displacement potentials that can be generated by the ICs 13 may include candidates that will not be used.

The number and magnitude of the candidate displacement potentials, and the potential difference between candidates that are adjacent to each other in order of the magnitudes of the potentials, may be set as appropriate. For example, the number of candidate displacement potentials may be two, three, or more. When the number of candidate displacement potentials is three or more, the potential differences (two or more) between candidates that are adjacent to each other in order of the magnitudes of the potentials may be constant (as in the illustrated example) or may not be constant. The variation, if not constant, may be set as desired.

Shading Correction Method

In the above-described printer 1, discharge characteristics may vary among the multiple recording elements 15. For example, even if the intention is to form dots of the same size on the recording medium, there will be differences in the size of the dots among the multiple recording elements 15. Reasons for this may include, for example, errors in manufacture of the nozzles 5, differences between the positions of the individual flow channels 25 relative to the common flow channel 23, and variations in the potential of the first driving waveform signal Sga1. Such differences in the states of dots will appear in the image as unintended shading (density spots), for example.

Figure 6:
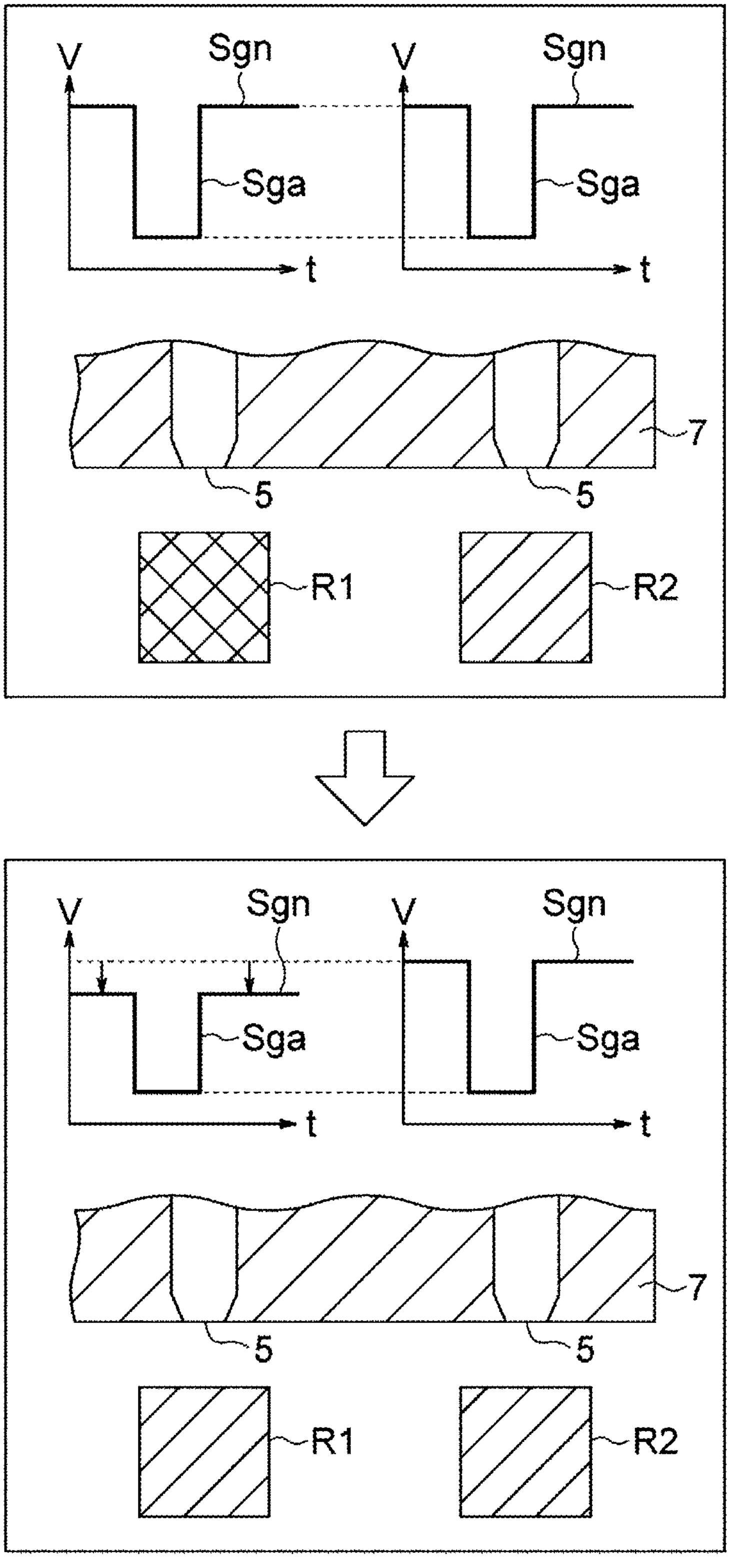
FIG. 6 is a schematic diagram illustrating an overview of a method for correcting density spots.

FIG. 6 is a schematic diagram illustrating an overview of a method for correcting density spots.

The upper part of FIG. 6 illustrates a situation in which an unintended density spot occurs. Specifically, in the illustrated example, the same driving waveform signal Sga is input to the actuators 17 for two nozzles 5. In other words, the density value in a region R1 where dots are formed by one nozzle 5 and the density value in a region R2 where dots are formed by the other nozzle 5 are intended to be identical to each other. However, the density value of the region R1 is higher than the density value of the region R2. The density value is, for example, an optical density (OD) value.

The lower part of FIG. 6 illustrates a situation in which the unintended density spot is corrected. Specifically, the potential of the non-waveform signal Sgn (standby potential Vw) input to the actuator 17 for the nozzle 5 having a relatively higher density value is lowered. This reduces the amplitude of the driving waveform signal Sga input to the actuator 17 for the nozzle 5 having a relatively higher density value. As a result, for example, the size of a single droplet is reduced and the unintended shading in regions R1 and R2 is reduced.

The above adjustment (from another perspective, setting) of the standby potential Vw is performed for each of the recording elements 15, for example. In other words, the standby potential Vw differs depending on the recording element 15. In other words, in this embodiment, the standby potential Vw for at least one recording element 15 is different from the standby potential Vw for at least another recording element 15. In the case where the standby potential Vw differs depending on the recording element 15, there may be two or more recording elements 15 whose standby potentials Vw are identical to each other due to no unintended density spots having been produced.

The standby potential Vw may be adjusted for each of divided regions obtained by dividing the facing surface 3*a* of the head body 3 into multiple regions. In this case, each divided region may contain two or more nozzles. In other words, a common standby potential Vw may be set for two or more recording elements 15. Even in this case, the standby potential Vw for at least one recording element 15 is still different from the standby potential Vw for at least another recording element 15.

In FIG. 6, a mode in which the standby potential Vw is adjusted (in the illustrated example, the standby potential Vw is lowered) in order to lower the density value for the recording element 15 having a relatively high density value is described. However, unlike in the illustrated example, the standby potential Vw may be adjusted so as to increase the density value for the recording element 15 having a relatively low density value (the standby potential Vw may be increased). Adjustments that lower a density value may also be used in combination with adjustments that increase a density value. For convenience, in the description of this embodiment, description may be given while assuming a mode in which the standby potential Vw is adjusted (more precisely, lowered) so as to lower the density value for the recording element 15 having a relatively high density value, as illustrated in FIG. 6.

Standby Potential Used to Correct Shading

Let us return to FIG. 5. In FIG. 5, multiple types of non-waveform signals Sgn in which the standby potential Vw has different magnitudes are illustrated using one solid line and multiple double-dashed lines. In other words, the values that can be taken by the standby potential Vw when adjusting the density value as described above are illustrated. The values that the standby potential Vw can take may be set as appropriate.

For example, the values that the standby potential Vw can take may be discrete (as in the illustrated example) or continuous values. From another perspective, the standby potential Vw may be selected from among multiple candidate standby potentials (as in the illustrated example), or may be any value within a prescribed range of potentials.

In a mode in which the standby potential Vw is selected from among multiple candidate standby potentials, the number of multiple candidate standby potentials may be set as appropriate, for example, there may be two, three, or more. In the description of this embodiment, a mode in which there are nine candidate standby potentials, from V6_0 to V6_8 (refer to FIG. 8) is taken as an example. For convenience, in FIG. 5 only six of the nine candidate standby potentials are illustrated. Out of the nine candidate standby potentials, only the highest candidate standby potential V6_8 and the lowest candidate standby potential V6_0 are indicated with reference symbols.

If the potential of the driving waveform signal Sga is intended to change to only one out of a higher potential side and a lower potential side (only the lower side in the illustrated example) relative to the standby potential Vw, all the candidate standby potentials may be made higher (illustrated example) or lower for all displacement potentials. If the potential of the driving waveform signal Sga is intended to vary on both the higher potential side and the lower potential side with respect to the standby potential Vw, all of the candidate standby potentials may fall between two specific displacement potentials having magnitudes that are adjacent to each other in the order of the magnitudes.

The specific magnitudes of the multiple candidate standby potentials may be set as desired.

For example, the potential difference between a candidate standby potential and a candidate displacement potential that are adjacent to each other in the order of the magnitudes of the potentials (the potential difference between V5 and V6_0 in the illustrated example) may be larger, equal to, or smaller than (as in the illustrated example) at least one of (for example, all of) the potential differences between every pair of candidate displacement potentials that are adjacent to each other in the order of the magnitudes of the potentials. The ratio between the two when the former is greater or less than the latter may also be set as desired. For example, the former may be at least ¼ and no more than 1 times the latter.

For example, the potential difference between a candidate standby potential and a candidate displacement potential that are adjacent to each other in the order of the magnitudes of the potentials (the potential difference between V5 and V6_0 in the illustrated example) may be larger than (as in the illustrated example), equal to, or smaller than at least one of (for example, all of) the potential differences between every pair of candidate standby potentials that are adjacent to each other in the order of the magnitudes of the potentials. The ratio between the two when the former is greater or less than the latter may also be set as desired. For example, the former may be between 5 times or more and 30 times or less the latter.

For example, when focusing on multiple candidate displacement potentials that are positioned on either the high potential side or the low potential side (low potential side in the illustrated example) of multiple candidate standby potentials, the potential difference between the candidate standby potential that is farthest away from the multiple displacement potentials (V6_8 in the illustrated example) and the candidate displacement potential that is closest to the multiple candidate standby potentials (V5 in the illustrated example) may be larger than, equal to (as in the illustrated example), or smaller than at least one of (for example, all of) the potential differences between every pair of candidate displacement potentials that are adjacent to each other in the order of the magnitudes of the potentials.

For example, the multiple candidate standby potentials may or may not include a candidate standby potential (V6_8 in the example illustrated in the figure) for which the potential difference from the candidate displacement potential closest to the multiple candidate standby potentials is the same as at least one of (for example, all of) the potential differences between every pair of candidate displacement potentials that are adjacent to each other in the order of the magnitudes of the potentials.

The potential difference between multiple candidate standby potentials may be set as appropriate.

When the number of candidate standby potentials is three or more, the potential differences (two or more) between candidates that are adjacent to each other in the order of the magnitudes of the potentials may be constant (as in the illustrated example) or may not be constant. The variation, if not constant, may be set as desired.

For example, at least one of (for example, all of) the potential differences between every pair of candidate standby potentials that are adjacent to each other in the order of the magnitudes of the potentials may be smaller than (as in the illustrated example), equal to, or larger than at least one of (for example, all of) the potential differences between every pair of multiple candidate displacement potentials that are adjacent to each other in the order of the magnitudes of the potentials. The ratio between the two when the former is smaller or larger than the latter may also be set as desired. For example, the former may be ½ or less, ⅕ or less, 1/10 or less, or 1/20 or less of the latter. The former may be 1/1000 or more, 1/100 or more, 1/50 or more, or 1/20 or more of the latter. The above-mentioned upper limit and lower limit may be used in combination with each other as appropriate, as long as no contradictions arise.

At least one of (for example, all of) the potential differences between every pair of candidate standby potentials that are adjacent to each other in the order of the magnitudes of the potentials is naturally smaller than the potential difference between the candidate (V6_8) most distant from the multiple candidate displacement potentials, out of the multiple candidate standby potentials, and the candidate (V0) most distant from the multiple candidate standby displacement potentials, out of the multiple candidate displacement potentials. The ratio of the former to the latter may be set as desired. For example, the former may be 5% or less, 2% or less, 1% or less, or 0.5% or less of the latter.

In driving waveform signals Sga in which the magnitudes and temporal arrangements of displacement potentials are identical to each other (in effect, driving waveform signals Sga in which only the standby potentials Vw differ from each other), the timings (times within a period T1) of the start of the fall from the standby signal Vw to the first displacement potential (V5 in the illustrated example) may be the same as or different from each other. In the former case, the timing at which the driving waveform signal Sga reaches the first displacement potential differs according to the difference in standby potential Vw. In the latter case, for example, the timings at which the driving waveform signals Sga begin to fall may or may not be adjusted depending on the standby potentials Vw so as to reduce the differences between the timings at which the driving waveform signals Sga reach the first displacement potential as described above.

For convenience, FIG. 5 illustrates a mode in which the timings at which the driving waveform signals Sga reach the first displacement potential (V5) are identical to each other (the timings at which the signals begin to fall depend on the standby potentials Vw), regardless of the difference in standby potential Vw. However, in the description of this embodiment, a mode in which the timings at which the signals begin to fall are the same, regardless of the difference in standby potential Vw, is taken as an example. When the potential difference between candidate standby potentials is sufficiently small relative to the amplitude of the driving waveform signal Sga, as in this embodiment, the difference in the shape of the driving waveform signals Sga in the above two modes is a minor difference, and the two modes need not necessarily be distinguished from each other.

Similarly, in driving waveform signals Sga in which the magnitudes and temporal arrangements of the displacement potentials to which the potential will transition are identical to each other (in effect, driving waveform signals Sga in which only the standby potentials Vw differ from each other), the timings at which the potential begins to rise from the final displacement potential (V5 in the first driving waveform signal Sga1 in the illustrated example) to the standby signal Vw may be the same (as in illustrated example) or different from each other. In the description of this embodiment, a mode in which the timings at which the potential begins to rise from the final displacement potential to the standby potential Vw are the same, regardless of differences in the standby potential Vw is taken as an example. When the potential difference between candidate standby potentials is sufficiently small relative to the amplitude of the driving waveform signal Sga, as in this embodiment, the difference in the shape of the driving waveform signals Sga in the above two modes is a minor difference, and the two modes need not necessarily be distinguished from each other.

Overview of Configuration of Control System

Figure 7:
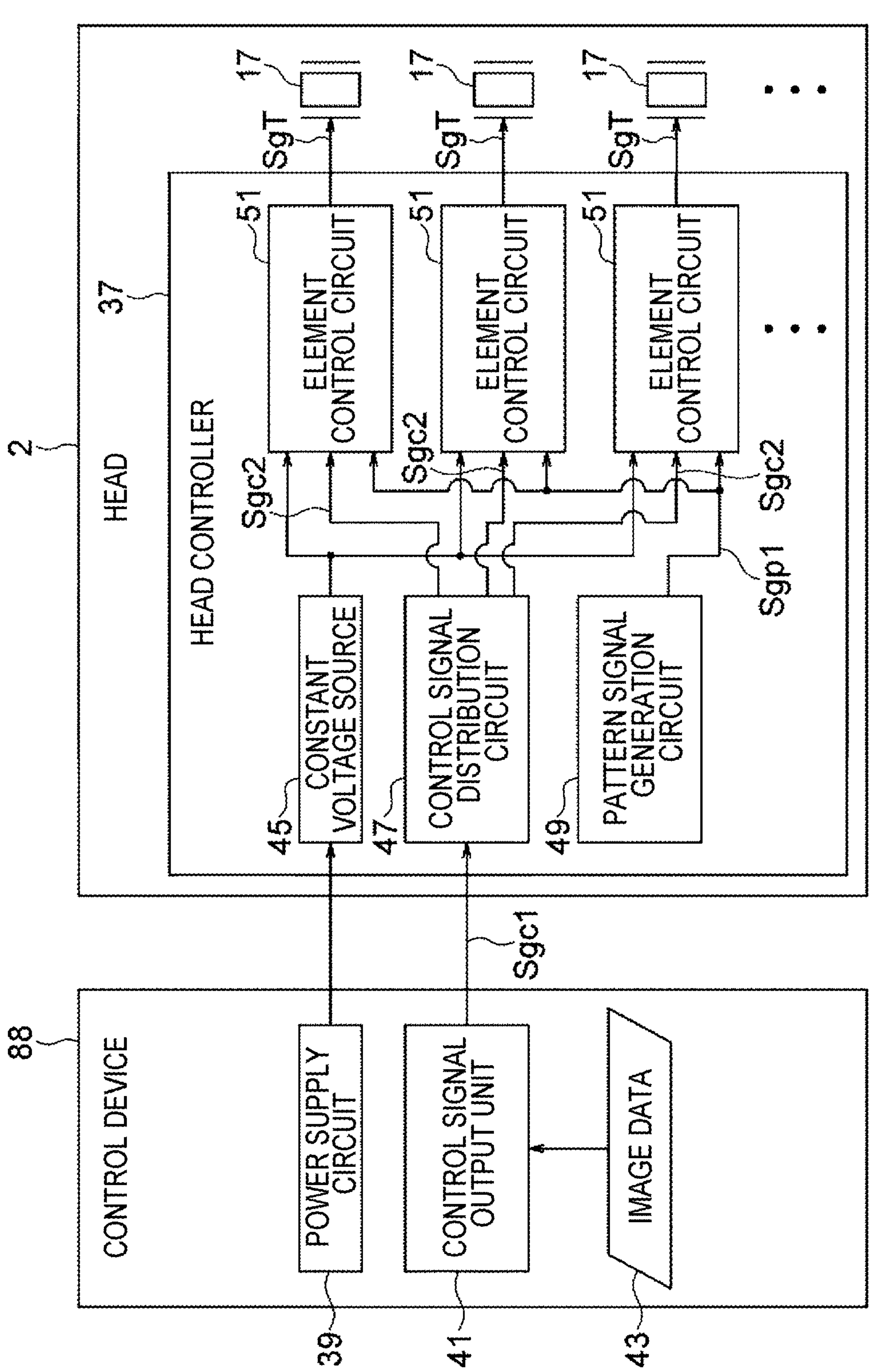
FIG. 7 is a block diagram schematically illustrating a configuration related to a control system of the recording device according to the First Embodiment.

FIG. 7 is a block diagram schematically illustrating the configuration of a control system of the printer 1.

The printer 1 includes the already described control device 88 and a head controller 37, which is mounted in the head 2 (or head body 3).

The control device 88 is not mounted in the head 2 and is located, for example, in a part of the printer 1 that does not move. More precisely, for example, the control device 88 is provided in a control panel disposed near the moving section 85 and the head 2, and so on. For example, in a case where the printer 1 is relatively small, the control device 88 is housed in the housing of the printer 1.

The head controller 37 is configured, for example, by the previously mentioned IC 13. In addition to the IC 13, the head controller 37 may include another circuit board (printed circuit board (PCB) on which ICs and other components are mounted) connected to the flexible substrate 11. The head controller 37 and the control device 88 are electrically connected to each other via the flexible substrate 11 or the like, as previously described.

The previously mentioned distribution unit acting as an intermediary between the control device 88 and the head controller 37 is not illustrated here. When the distribution unit is provided, some of the components of the control device 88 and the head controller 37, described below, may be provided in the distribution unit.

Control Device

The control device 88 includes a power supply circuit 39 and various functional units. In addition to a control signal output unit 41 illustrated in the figure, the various functional units include, for example, a controller that controls the speed of the moving section 85.

The power supply circuit 39, for example, converts power from a power source external to the printer 1 (AC power from a commercial power source, for example) into a DC voltage of a prescribed voltage and supplies the DC voltage to the head controller 37. The conversion to DC voltage and so on may be performed in the head 2. The configuration of the power supply circuit 39 may be substantially the same as that of any of various known power supply circuits.

The various functional units of the control device 88 may be configured, for example, by a computer. Although not specifically illustrated, the computer includes a central processing unit (CPU), a read only memory (ROM), a random access memory (RAM), and an external storage device. The CPU executes the programs stored in the ROM and/or external storage device in order to realize the various functional units.

The control signal output unit 41 outputs a control signal Sgc1 to the head controller 37 based on image data 43 stored in the RAM or the external storage device. In other words, the control signal output unit 41 outputs a signal that varies in accordance with the content of the image to be printed. The concept of the term "image" used here includes text.

The control signal Sgc1, for example, includes information specifying the operation of multiple (all) recording elements 15 in the period T1 (FIG. 4). The information specifying the operation of the recording elements 15 includes, for example, information specifying whether or not to form dots on the recording medium and, if so, the sizes of the dots. In terms of the format of the data, the information specifying whether or not to form dots and the information specifying the sizes of the dots may be the same information. For example, information specifying a dot size other than 0 may be regarded as information specifying that a dot is to be formed. The control signal Sgc1 is output every period T1, for example.

The method used to transmit the control signal Sgc1 may be any appropriate method. For example, information relating to the operation of one recording element 15 may be output in parallel as a prescribed number of bits of data (for example, 3 bits). Data relating to multiple recording elements 15 may be output serially.

Head Controller

The head controller 37 includes components provided so to be shared by multiple actuators 17 and components individually provided for each actuator 17. The former includes, for example, a constant voltage source 45, a control signal distribution circuit 47, and a pattern signal generation circuit 49. The latter includes, for example, multiple element control circuits 51. However, multiple components provided individually for multiple actuators 17 may all be conceptualized as a single component. This applies to not only the multiple element control circuits 51, but also for the components (see below) constituting the multiple element control circuits 51.

The constant voltage source 45 generates DC power (from another perspective, a constant potential) from power supplied by the power supply circuit 39 and the generated DC power is used to generate the individual signals SgI that are input to the individual electrodes 35. This constant potential is input to the multiple element control circuits 51.

Although not specifically illustrated, the head controller 37 may include, in addition to the constant voltage source 45, a power supply circuit that supplies the various circuits (47, 49, and 51) with the power necessary to drive these circuits.

The various circuits (47, 49 and 51) of the head controller 37 are configured, for example, by logic circuits that perform predefined operations. For example, registers, flip-flops, latches, AND circuits, and OR circuits may be listed as elements used to configure the logic circuits. However, some or all of the various circuits may be configured by a computer similarly to the control device 88.

The control signal distribution circuit 47 distributes the control signal Sgc1 from the control signal output unit 41 to the multiple element control circuits 51. Specifically, as described above, the control signal Sgc1 contains information specifying the operation of multiple (all) of the recording elements 15 in each period T1. Therefore, the control signal distribution circuit 47 divides the input control signal Sgc1 into control signals Sgc2 for the individual recording elements 15 and inputs the control signals Sgc2 to the corresponding element control circuits 51.

Specifically, for example, the control signal distribution circuit 47 is serially inputted with the data relating to the multiple recording elements 15 included in the control signal Sgc1 every period T1. The control signal distribution circuit 47 converts the input serial data into the same number pieces of parallel data (control signals Sgc2) as the number of the multiple recording elements 15 by using shift registers and latch circuits. One control signal, Sgc2, for example, contains a prescribed number of bits of data (for example, 3 bits) specifying the operation of one recording element 15. The prescribed number of bits of data are input serially or in parallel to the element control circuits 51.

The pattern signal generation circuit 49 inputs a pattern signal Sgp1 containing information used to generate the individual signals SgI, which are input to each individual electrode 35, to each of the multiple element control circuits 51. The information used to generate the individual signals SgI is, for example, information specifying the pattern of variation of the potential of each of the two or more types of periodic signals SgT (non-driving periodic signal SgN and one or more driving periodic signals SgA).

Each of the multiple element control circuits 51 selects information of one periodic signal SgT from among information of the two or more types of periodic signals SgT contained in the pattern signal Sgp1 based on the control signal Sgc2 supplied from the control signal distribution circuit 47. Each element control circuit 51 then generates a periodic signal SgT using the power (potential) supplied from the constant voltage source 45 based on the information of the selected periodic signal SgT.

The periodic signals SgT generated in the multiple element control circuits 51 are input to the individual electrodes 35 of the corresponding actuators 17. When the periodic signal SgT is the driving periodic signal SgA, a droplet is discharged from the nozzle 5. When the periodic signal SgT is the non-driving periodic signal SgN, no droplet is discharged from the nozzle 5.

The periodic signals SgT are set to the appropriate standby potential Vw for each actuator 17, as described with reference to FIG. 5 and FIG. 6, and this reduces shading spots, for example. The standby potential Vw for each actuator 17 is set by the corresponding element control circuit 51, for example.

Constant Voltage Source

Figure 8:
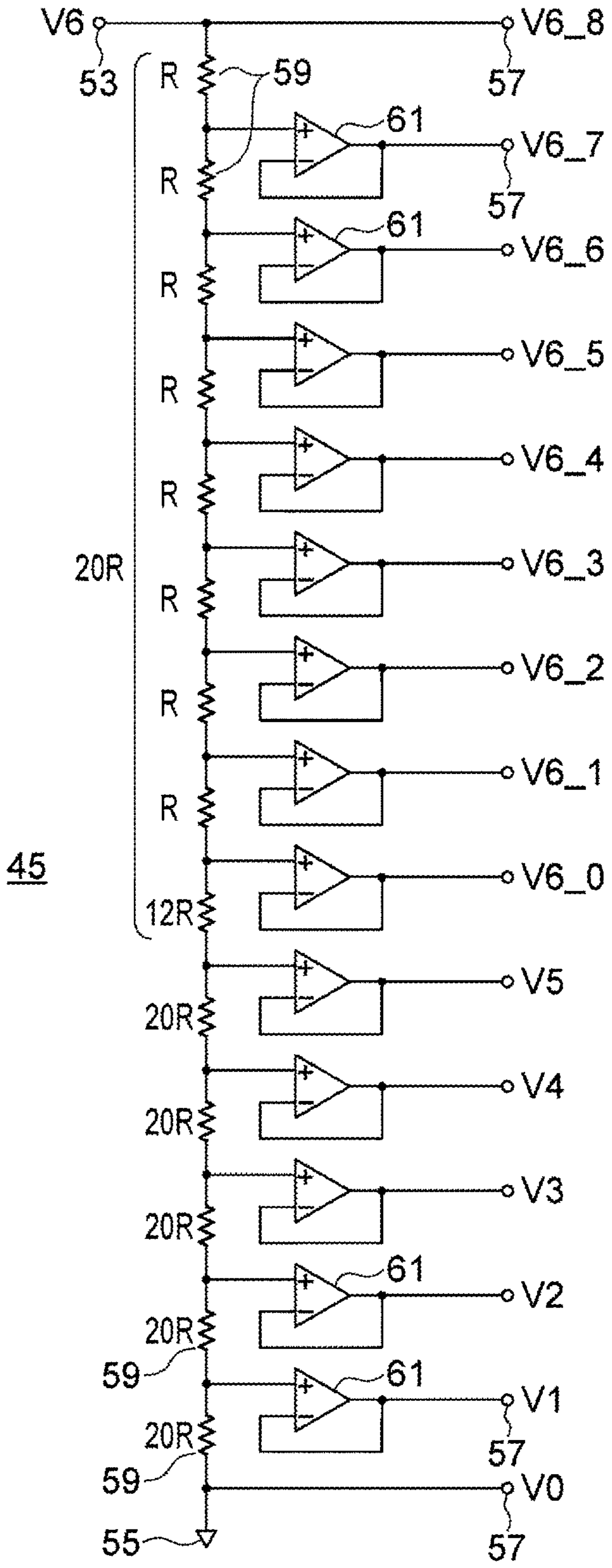
FIG. 8 is a circuit diagram illustrating an example of the configuration of a constant voltage source illustrated in FIG. 7.

FIG. 8 illustrates an example of the configuration of the constant voltage source 45 of the head controller 37.

The constant voltage source 45 is equipped with the following terminals, for example. An input terminal 53 to which a potential V6, which is different from a reference potential, is input. A reference potential terminal 55 to which the reference potential is input. Multiple (fifteen in the illustrated example) output terminals 57 that output potentials V0 to V5 and V6_0 to V6_8, which have different magnitudes from each other.

The input terminal 53 is supplied with the potential V6 from the power supply circuit 39 of the control device 88, for example. The potential V6 is a potential that has a constant magnitude with respect to the passage of time. The reference potential terminal 55 is supplied with a reference potential from the power supply circuit 39 (or another suitable reference potential unit). In other words, the constant voltage source 45 has a DC voltage of the voltage V6 applied between the reference potential terminal 55 and the input terminal 53 by the power supply circuit 39. Although not specifically illustrated, a circuit may be provided before and/or after the input terminal 53 in order to convert power from the power supply circuit 39 to DC power of the voltage V6.

Each of the multiple output terminals 57 is connected to the corresponding one of the multiple element control circuits 51, for example. Then, all the multiple potentials V0 to V5 and V6_0 to V6_8 are input in parallel to each element control circuit 51. The multiple potentials V0 to V5 and V6_0 to V6_8 are potentials having a constant magnitude with respect to the passage of time and also correspond to candidate displacement potentials V0 to V5 and candidate standby potentials V6_0 to V6_8 of the individual signal SgI illustrated in FIG. 5. Thus, each element control circuit 51 can generate and supply to the corresponding actuator 17 an individual signal SgI in which the potential transitions in sequence from the standby potential to one or more displacement potentials by selectively outputting to the actuator 17 one of the multiple potentials input in parallel to the element control circuit 51.

A configuration for converting the input potential V6 into the multiple potentials V0 to V5 and V6_0 to V6_8 and then outputting these potentials may be any of various configurations including known configurations. In the illustrated example, a voltage divider circuit is used. Specifically, the constant voltage source 45 includes multiple (14 in the illustrated example) resistors 59 connected in series between the input terminal 53 and the reference potential terminal 55. The multiple output terminals 57 are connected to positions between the multiple resistors 59 or to positions on the input terminal 53 side or the reference potential terminal 55 side of all the resistors 59, and have different connection positions from each other. The multiple output terminals 57 are supplied with different potentials from each other due to the voltage drops occurring in the resistors 59, the potentials being generated at the different connection positions.

As may be understood from the previous description of the candidate displacement potentials V0 to V5 and the candidate standby potentials V6_0 to V6_8, the number of resistors 59 and the resistance values of the resistors 59 may be set as appropriate. In the example in the figure, the following is illustrated.

In FIG. 8, the resistance value of each resistor 59 is illustrated in the form of a ratio of the resistance value to a reference value R, which is a prescribed resistance value. The resistance values of the five resistors 59 positioned between the six output terminals 57 held at the potentials V0 to V5 are 20 R. The resistance value of the resistor 59 positioned between the output terminal 57 held at the potential V5 and the output terminal 57 held at potential V6_0 is 12 R. The resistance values of the eight resistors 59 positioned between the nine output terminals 57 held at the potentials V6_0 to V6_8 are R. The combined resistance value of the resistor 59 having a resistance value of 12 R and the eight resistors having resistance values of R is 20 R.

Therefore, for example, among the six candidate displacement potentials V0 to V5, the potential differences between potentials adjacent to each other in the order of the magnitudes of the potentials are constant. Among the nine candidate standby potentials V6_0 to V6_8, the potential differences between the potentials adjacent to each other in the order of the magnitudes of the potentials are constant. The latter potential differences are 1/20 of the former potential differences. The potential difference between the candidate displacement potential V5, which has a potential magnitude closest to the candidate standby potential candidates, and the candidate standby potential V6_8, which has a potential magnitude farthest from the candidate displacement potentials, is the same as the potential difference between potentials adjacent to each other in the order of the potential magnitudes among the candidate displacement potentials V0 to V5.

In the illustrated example, the candidate standby potential V6_8 is set to be equal to the potential V6 input to the input terminal 53. However, a resistor 59 may be provided immediately after the input terminal 53 (on the side closer to the input terminal 53 than to the node of the output terminal 57 held at the candidate standby potential V6_8) in order to make the candidate standby potential V6_8 different from the potential V6.

In the illustrated example, the candidate displacement potential V0 is set to be equal to the reference potential input to the reference potential terminal 55. However, a resistor 59 may be provided immediately before the reference potential terminal 55 (on the side closer to the reference potential terminal 55 than to the node of the output terminal 57 held at the candidate displacement potential V0) in order to make the displacement potential V0 different from the reference potential.

The constant voltage source 45 may include a voltage follower circuit. In the illustrated example, a voltage follower circuit is provided for each of the output terminals 57, except for the output terminals 57 at the potentials V0 and V6_8. Each voltage follower circuit includes an operational amplifier 61. The non-inverting input terminal of operational amplifier 61 is supplied with a potential generated by a voltage divider. The inverting input terminal of the operational amplifier 61 is supplied with the potential output by the operational amplifier 61. The voltage follower circuit enables, for example, a desired potential to be stably supplied to the output terminal 57.

Connections Between Element Control Circuit and Surrounding Circuits

Figure 9:
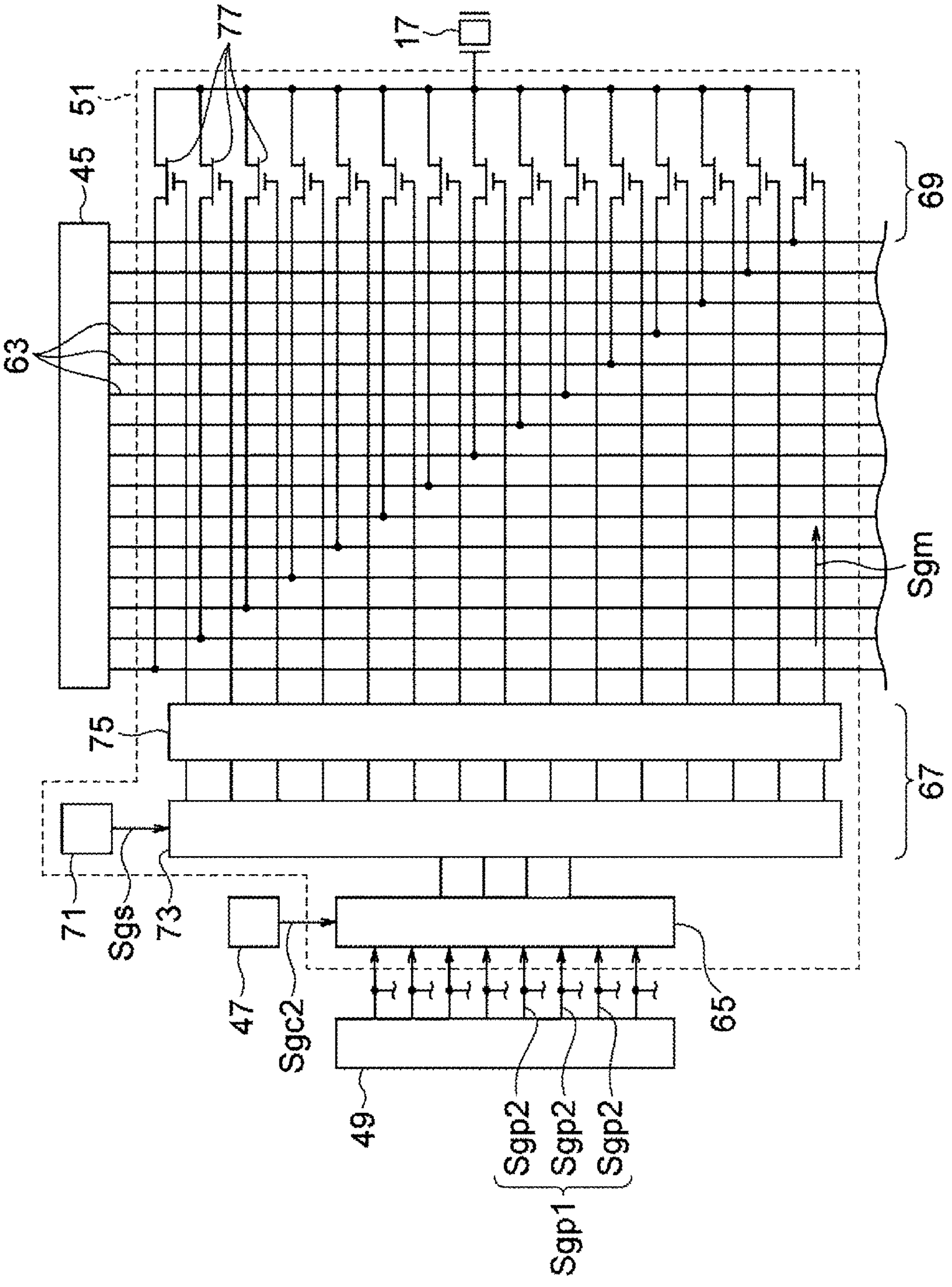
FIG. 9 is a circuit diagram illustrating an example of the configuration of an element control circuit illustrated in FIG. 7.

FIG. 9 illustrates a block diagram illustrating the components of the element control circuit 51 and the previously mentioned components (45, 47, 49, and so on) connected to the element control circuit 51. Only one of the multiple element control circuits 51 is illustrated here.

As described with reference to FIG. 7, each of the multiple element control circuits 51, based on the control signal Sgc2 from the control signal distribution circuit 47, selects information of one of the multiple types of periodic signals SgT (SgA and SgN) contained in the pattern signal Sgp1 from the pattern signal generation circuit 49. The element control circuit 51 then generates the periodic signals SgT using the power (potential) supplied from the constant voltage source 45 based on the pattern of variations of potential specified by the information in the selected periodic signal SgT.

The constant voltage source 45 inputs multiple potentials V0 to V5 and V6_0 to V6_8 in parallel to each of the multiple element control circuits 51, as described with reference to FIG. 8. For example, multiple (fifteen in the illustrated example) output terminals 57 (FIG. 8) of the constant voltage source 45 are connected to multiple wiring lines 63 that extend vertically in the figure. The constant voltage source 45 supplies multiple potentials to each of the multiple element control circuits 51 via the multiple wiring lines 63. As indicated by the broken line at the bottom of the multiple wiring lines 63, the multiple wiring lines 63 extend over multiple (some or all) element control circuits 51 and are shared by multiple element control circuits 51.

The control signal distribution circuit 47 inputs the control signal Sgc2, which contains information specifying the operation of each recording element 15 for each period T1, to the corresponding element control circuit 51. In FIG. 9, the control signal Sgc2 input to one element control circuit 51 is illustrated. This signal is a signal in which the content of the information held changes in accordance with the contents of the image data 43 (in accordance with whether or not dots need to be formed and the diameter of the dots), and is generated and input individually to the multiple element control circuits 51.

The pattern signal generation circuit 49 inputs the pattern signal Sgp1, which has information specifying the pattern of variations of potential in each of the multiple types of periodic signals SgT, to each of the multiple element control circuits 51. In FIG. 9, the pattern signal Sgp1 input to one element control circuit 51 is illustrated. The same pattern signal Sgp1 is, for example, input to multiple element control circuits 51, as indicated by lines branching from the line representing the pattern signal Sgp1 (Sgp2) and broken lines.

The pattern signal Sgp1 contains, for example, as many types of pattern signals Sgp2 as the number of types of periodic signals SgT (two or more). Multiple types (8 types in the illustrated example) of pattern signals Sgp2 are output from the pattern signal generation circuit 49 in parallel with each other every period T1, for example. One of the multiple pattern signals Sgp2 corresponds to the non-driving periodic signal SgN. The remaining seven pattern signals Sgp2 correspond, for example, to seven different driving periodic signals SgA, which have different potential variation patterns from each other.

The information specifying the potential variation pattern in one type of periodic signal SgT is, in other words, information of a time series of the potential within one type of periodic signal SgT. The potentials included in this time series are limited to the candidate displacement potentials V0 to V5 and the candidate standby potentials V6_0 to V6_8, for example. As described below, in this embodiment, the information of the standby potential Vw in the pattern signal Sgp1 is corrected by the element control circuit 51. Therefore, regarding the information on standby potentials in the pattern signal Sgp2, there is no need to distinguish between the candidate standby potentials V6_0 to V6_8 so long as the fact that the potentials specified by the information are standby potentials can be determined. Therefore, for example, the potentials included in the time series may be limited to only the candidate displacement potentials V0 to V5 and the candidate standby potential V6_0.

The method used to transmit one type of pattern signal Sgp2 and so forth may be set as appropriate. For example, one type of pattern signal Sgp2 is formed by multiple pieces of data specifying each of multiple different potentials (15 in this case) transmitted serially in chronological order. Thus, the order of transmission of the multiple pieces of data is information indicating the temporal arrangement of multiple different potentials in a time series.

In the case where multiple pieces of data within one pattern signal Sgp2 are serially transmitted as described above, the period T2 (refer to FIG. 5) in which one piece of data is transmitted may, for example, have a length obtained by dividing the period T1 by the number of pieces of data in one pattern signal Sgp2 into regions of equal size. In this case, the period T2 may be used as information specifying the time during which the potential specified by each piece of data is to be maintained.

One piece of data specifying one potential, for example, contains a prescribed number of bits of information (for example, 4 bits). The prescribed number of bits of information are input serially or in parallel from the pattern signal generation circuit 49 to each element control circuit 51.

The configuration of the pattern signal generation circuit 49 that generates the pattern signal Sgp2 (Sgp1) may be any appropriate configuration. For example, although not specifically illustrated, the pattern signal generation circuit 49 may include the following components. A clock that outputs a clock signal every period T2. A register that contains information on the time series of multiple (15 types of) potentials in each of multiple (8 types of) periodic signals SgT. A logic circuit that sequentially reads and outputs data of the potentials held by a register based on a clock signal.

Element Control Circuit

In the element control circuit 51, the configuration for realizing the operation of generating and outputting periodic signals SgT from the potential of the constant voltage source 45 based on the control signal Sgc2 and the pattern signal Sgp2 may be any appropriate configuration. In the example in the figure, the following is illustrated.

The element control circuit 51 includes, for example, the following components. A pattern signal selection circuit 65 that selects any one pattern signal Sgp2 from among multiple pattern signals Sgp2 based on the control signal Sgc2. A correction circuit 67 that corrects the information of the standby potential Vw in the selected pattern signal Sgp2. A switch circuit 69 that switches the connection relationship between the constant voltage source 45 and the actuator 17 based on a corrected pattern signal Sgm corrected by the correction circuit 67.

The periodic signal SgT (SgA or SgN) is generated by switching of the connection relationship by the switch circuit 69, as described previously. This switching is performed based on the corrected pattern signal Sgm, in which the information of the standby potential Vw has been corrected, and as a result, the standby potential Vw of the periodic signal SgT is corrected, as described with reference to FIG. 5 and FIG. 6. By correcting the information of the standby potential Vw for each element control circuit 51, the standby potential Vw is individually set for each recording element 15. In other words, the standby potential Vw input to at least one of the multiple recording elements 15 can be made different from the standby potential Vw input to at least another one of the multiple recording elements 15.

The correction circuit 67 may include components other than those listed above. For example, between the pattern signal selection circuit 65 and the correction circuit 67, a delay circuit for delaying the timing of transmission of the pattern signal Sgp2 may be provided, or a circuit may be provided for converting a pattern signal Sgp2 of a format shorter than the period T2 (format in which the time for which the signal corresponding to information of each potential is maintained is shorter than the time for which each potential is to be actually maintained) into a pattern signal Sgp2 of a format that spans the period T2.

Pattern Signal Selection Circuit

For example, based on the control signal Sgc2, the pattern signal selection circuit 65, for example, selects and outputs one of the pattern signals Sgp2 input thereto in parallel. The transmission method and so on used at the output of the pattern signal selection circuit 65 may be set as appropriate. The transmission method and so on used for the pattern signal Sgp2 may differ before input to the pattern signal selection circuit 65 and after output from the pattern signal selection circuit 65 so long as the content of the information of the pattern signal Sgp2 is maintained. In the illustrated example, the pattern signal selection circuit 65 outputs four bits of data in parallel as the pattern signal Sgp2 to the correction circuit 67 (one bit of data is output along one wiring line.). The pattern signal selection circuit 65, for example, outputs the pattern signal Sgp2 while maintaining the period T2 of the input pattern signal Sgp2 (and the time during which the signal corresponding to the information of each potential is maintained).

Correction Circuit

The correction circuit 67 includes, for example, the following components. A selector 71 that outputs a selection signal Sgs specifying the standby potential Vw to be set for the corresponding actuator 17. A decoder 73 that corrects the pattern signal Sgp2 based on the selection signal Sgs and generates and outputs a corrected pattern signal Sgm. A level shifter 75 that increases the signal strength of the corrected pattern signal Sgm.

The selector 71 includes, for example, a register, which holds information on the values of the standby potentials Vw to be set for the corresponding actuator 17. In other words, this information specifies one of the candidate standby potentials V6_0 to V6_8. The register may be volatile, for example, and may acquire the above information from a memory, which is not illustrated, shared by the multiple element control circuits 51 within the head 2 or from the control device 88 each time the printer 1 operates. The above information may be acquired from the memory or control device 88 at an appropriate time such as when a prescribed operation is performed on the printer 1. The register may be non-volatile and may hold the above information at all times. The content of the above information may be set by the manufacturer of the head 2 (or the printer 1) or by the printer 1 (refer to Fifth Embodiment below).

The selector 71 then outputs a selection signal Sgs in accordance with the content of the information held by the register. The transmission method and so on of the selection signal Sgs may be selected as appropriate. For example, the selection signal Sgs may consist of 4 bits of data transmitted serially or in parallel. The period of the output of the selection signal Sgs may be, for example, the period T2 or a period obtained by further division of the period T2. The selection signal Sgs may be a signal in which a constant potential is continuously maintained (a signal for which there is no concept of a period).

The decoder 73, for example, decodes the pattern signal Sgp2 and the selection signal Sgs, and outputs the corrected pattern signal Sgm in an output format using a base-N number system. Here, N is the total number of the candidate displacement potentials V0 to V5 and the candidate standby potentials V6_0 to V6_8, which is fifteen in the illustrated example. Thus, the decoder 73 is equipped with at least 15 output terminals, and FIG. 9 depicts 15 wiring lines extending from these 15 output terminals to the level shifter 75.

More precisely, the candidate displacement potentials V0 to V5 and the candidate standby potentials V6_0 to V6_8 have a one-to-one correspondence with the 15 output terminals. Multiple pieces of data each specifying one of the candidate displacement potentials V0 to V5 and the candidate standby potential Vw are serially input to the decoder 73 in the form of a single pattern signal Sgp2. Each time data is input, the decoder 73 outputs a signal from an output terminal corresponding to the potential specified by the data. No signals are output from the other output terminals. This signal constitutes the corrected pattern signal Sgm.

When the potential specified by the data input in the form of the pattern signal Sgp2 is a candidate standby potential Vw, the decoder 73 outputs a signal not from the output terminal corresponding to the candidate standby potential Vw specified by the pattern signal Sgp2 but from the output terminal corresponding to the candidate standby potential Vw (any one of V6_0 to V6_8) specified by the selection signal Sgs input by the selector 71. As a result, a corrected pattern signal Sgm, in which the information on the standby potential in the pattern signal Sgp2 has been corrected, is output.

As may be understood from the above description, the data format, transmission method, and so forth for the corrected pattern signal Sgm may differ from the data format, transmission method, and so forth for the pattern signal Sgp2. The signals that are selectively and sequentially output from the multiple output terminals of the decoder 73 as signals constituting the corrected pattern signal Sgm are, for example, signals having a constant potential that is higher or lower than a prescribed potential (for example, the reference potential). The output terminals are held at the above prescribed potential when not outputting the above signals. The above signal potentials and prescribed potential are the same for the multiple output terminals. The above signals constituting the corrected pattern signal Sgm are output over a period of time (period T2) during which the input of signals corresponding to the information of each potential in the pattern signal Sgp2 is maintained, for example. Thus, the entire corrected pattern signal Sgm is output over the period T1, for example.

The level shifter 75 is equipped with multiple (15) input terminals, which are connected in a one-to-one manner to the multiple (15 in the illustrated example) output terminals of the decoder 73, and multiple output terminals that correspond in a one-to-one manner to the multiple input terminals. The level shifter 75 increases the strength of signals input to the input terminals thereof and then outputs the signals to the corresponding output terminals. For example, the level shifter 75 converts a signal from the decoder 73 to a signal of a higher potential if the signal from the decoder 73 is higher than the prescribed potential, and converts the signal to a signal of a lower potential if the signal from the decoder 73 is lower than the prescribed potential. Other than the signal strength, for example, the input and output signals are identical. The corrected pattern signal Sgm is made sufficiently strong to control the switch circuit 69 when the signal strength is increased by the level shifter 75. The level shifter 75 may be omitted.

Switch Circuit

Signals (period T2), each specifying one of the candidate displacement potentials V0 to V5 and candidate standby potentials V6_0 to V6_8, included in the corrected pattern signal Sgm (period T1) are sequentially input to the switch circuit 69. The switch circuit 69 connects, to the actuator 17, the output terminals 57 that holds the potentials specified by the input signal of the period T2 out of the multiple output terminals 57 (wiring lines 63) of the constant voltage source 45. As a result, periodic signals SgT (SgA or SgN) with the pattern of potential variation specified by the corrected pattern signal Sgm are generated and output to the actuator 17.

The configuration of the switch circuit 69 that achieves the above operation may be any appropriate configuration. In the illustrated example, the switch circuit 69 includes multiple (15) switches 77 that are provided in a one-to-one manner for the multiple (15) output terminals 57 of the constant voltage source 45. Each of the multiple switches 77 can electrically connect and disconnect the corresponding output terminal 57 and the actuator 17 (individual electrode 35). Each of the multiple switches 77 is connected to the output terminal corresponding to the potential (V0 to V5 and V6_0 to V6_8) held by the corresponding output terminal 57 among the multiple (15) output terminals of the correction circuit 67 (level shifter 75). The switch 77 to which the signal of the period T2 contained in the corrected pattern signal Sgm is input connects the corresponding output terminal 57 to the actuator 17 for the period during which the signal is input (period T2). The other switches 77 disconnect the corresponding output terminals 57 from the actuator 17.

The configuration of each switch 77 may be any appropriate configuration. In the illustrated example, each switch 77 is illustrated as a field-effect transistor. The configuration of the field effect transistor may be any appropriate configuration. Another type of transistor may instead be used for the switches 77.

Example of Operation of Switch Circuit

Figure 10:
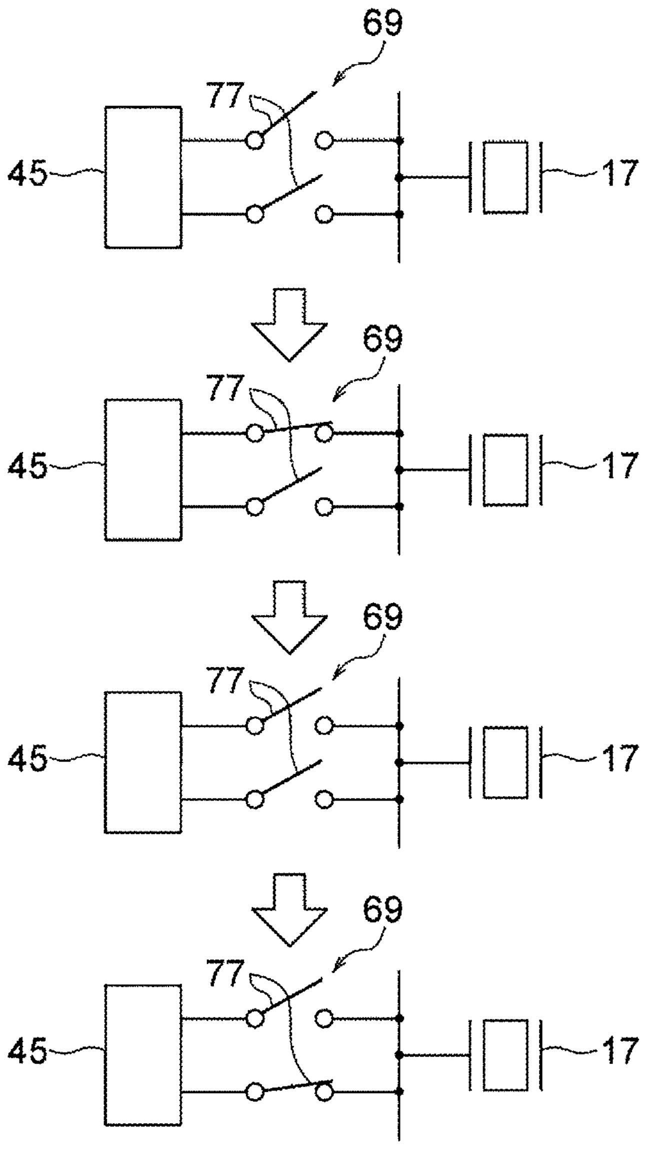
FIG. 10 is a schematic diagram illustrating a specific example of operation of a switch circuit illustrated in FIG. 9.

FIG. 10 is a schematic diagram illustrating a specific example of operation of the switch circuit 69. Here, a situation where two of the illustrated multiple switches 77 are turned on in sequence is assumed. In other words, while the illustrated operation is being performed, the other switches 77 are turned off.

In the top section of FIG. 10, a situation is illustrated in which the two switches 77 are turned off. Next, as illustrated in the next section down, the upper switch 77 is turned on. Next, as illustrated in the next section down, the upper switch 77 is turned off, and thus, the two switches 77 are turned off. Next, as illustrated in the lowermost section, the lower switch 77 is turned on.

Thus, when switching the output terminal 57 connected to the actuator 17, the switch circuit 69 may have a period of time when the actuator 17 is not connected to any of the multiple output terminals 57 (in other words, all of the switches 77 are turned off). In this way, for example, the probability of a short circuit occurring between the output terminals 57 is reduced. Although two switches 77 are used as an example here, the above period may be provided with respect to switching of all the switches 77. Alternatively, unlike in the illustrated example, the above period of time need not be provided.

The illustrated operation may be realized in any appropriate way. For example, the pattern signal generation circuit 49 may generate the pattern signal Sgp1 so that information of the time series of potentials includes information specifying that the switch 77 is turned off between the information of a first potential and the information of a second potential that is next to the first potential with respect to time and is different from the first potential. When the data input in the form of the correction pattern signal Sgp2 specifies that the switches 77 are switched off, the correction circuit 67 (the decoder 73) operates so that signals are not output from any of the multiple output terminals connected to the multiple (15) switches 77 (all output terminals are maintained at a potential corresponding to being turned off).

Figure 11A:
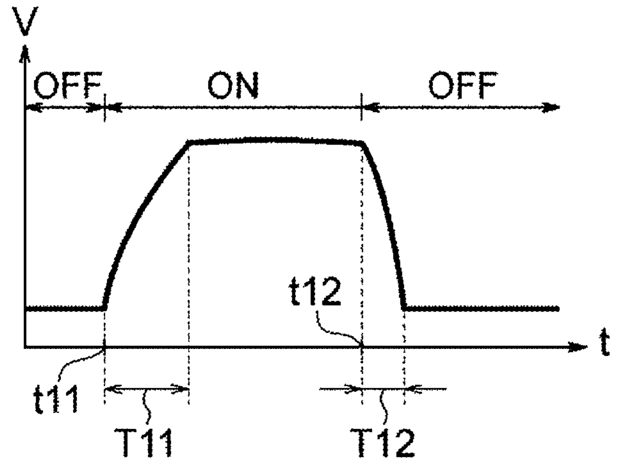
FIG. 11A is another schematic diagram illustrating a specific example of operation of the switch circuit illustrated in FIG. 9.

FIG. 11A is another schematic diagram illustrating a specific example of operation of the switch circuit 69. This figure illustrates the changes that occur over time in the potential applied from one switch 77 to the actuator 17 when the switch 77 is operated in a sequence of off, on, off. The horizontal axis t represents time and the vertical axis V represents potential.

The effect of the other switches 77 is ignored here. Therefore, when the switch 77 is turned off (for example, before time t11), the potential at the output side of the switch 77 (side where the actuator 17 is located) is a virtual prescribed potential (for example, the reference potential). When the switch 77 is turned on, the potential at the output side of the switch 77 is the potential at the input side of the switch 77 (the potential held by the corresponding output terminal 57).

The time t11 is the point in time when input of the signal of the period T2 included in the corrected pattern signal Sgm begins (turn on time) from the correction circuit 67 to the switch 77. As illustrated in this figure, in the switch 77, there is a time delay (transition time T11) from when the switch 77 is switched from off to on until when the potential at the output side transitions to a potential equivalent to that at the input side. Similarly, there is a time delay (transition time T12) from when the switch 77 is switched from on to off (after the input of the signal of period T2 included in the corrected pattern signal Sgm stops) until when the potential at the output side transitions to the prescribed potential.

The transition times T11 and T12 may be set as appropriate. The transition times may be equal to each other, or one may be shorter than the other. In the illustrated example, the transition time T11 when switching on is longer than the transition time T12 when switching off. The degree of difference between the two transition times may be set as appropriate. For example, the transition time T11 may be at least 1.1 times or more, 1.3 times or more, 1.5 times or more, or 2 times or more the transition time T12.

Figure 11B:
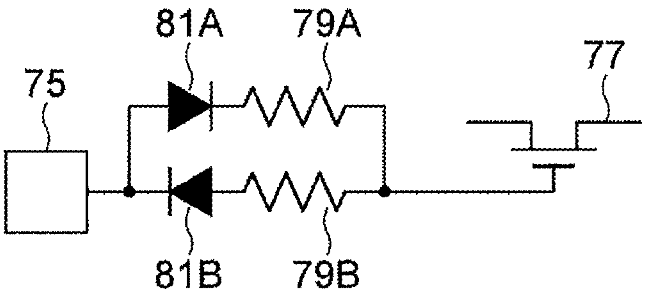
FIG. 11B is a circuit diagram illustrating an example of a configuration that realizes the operation in FIG. 11A.
Figure 11C:
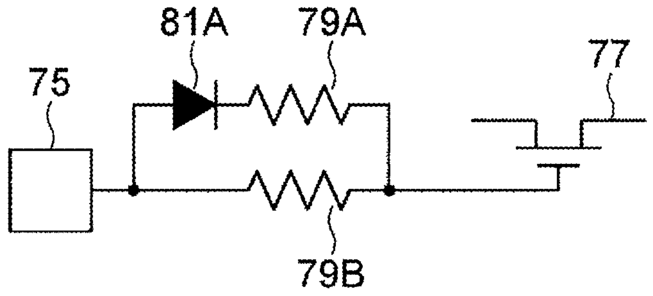
FIG. 11C is a circuit diagram illustrating another example of a configuration that realizes the operation in FIG. 11A.
Figure 11D:
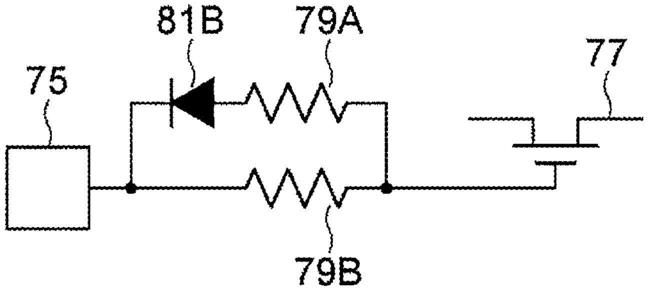
FIG. 11D is a circuit diagram illustrating yet another example of a configuration that realizes the operation in FIG. 11A.

The configuration used for adjusting the transition times T11 and T12 may be any of various configurations, including known configurations. FIGS. 11B to 11D illustrate examples of configurations for adjusting the transition times T11 and T12.

In the examples in FIGS. 11B to FIG. 11D, resistors 79A and 79B connected in parallel with each other and diodes 81A and/or 81B connected in series with the resistors are provided between the level shifter 75 and the switch 77. These elements may be provided for each of the switches 77 or may be shared by multiple (some or all) of the switches 77.

In the example in FIG. 11B, the transition time T11 can be lengthened by increasing the resistance value of the resistor 79A, and the transition time T12 can be lengthened by increasing the resistance value of the resistor 79B. In the example in FIG. 11C, the transition time T11 can be lengthened by increasing the resistance values of the resistors 79A and 79B, and the transition time T12 can be lengthened by increasing the resistance value of the resistor 79B. In the example in FIG. 11D, the transition time T11 can be lengthened by increasing the resistance value of the resistor 79B, and the transition time T12 can be lengthened by increasing the resistance values of the resistors 79A and 79B.

The effect of the transition times T11 and T12 on the individual signal SgI is also illustrated in the previously described FIG. 5. In other words, when the potential of the individual signal SgI transitions to the standby potential Vw or the displacement potentials V0 to V6 in sequence, the potential of the individual signal SgI does not immediately transition from one potential to the next, but rather transitions in a gradual manner. The period T2 also includes a transition time. As a result, the minimum time for which the individual signal SgI is held at the standby potential Vw or any of the displacement potentials V0 to V6 is shorter than the period T2.

As described above, the recording head (liquid discharge head 2 or head body 3) includes multiple recording elements 15 and a drive controller (head controller 37). The multiple recording elements 15 form dots that make up an image. The head controller 37 inputs an operation signal (for example, the individual signal SgI) to each of the multiple recording elements 15. The operation signal includes a standby signal (for example, non-waveform signal Sgn or non-driving periodic signal SgN consisting of only non-waveform signal Sgn. Hereinafter only one of them may be referred to) and a driving signal (for example, driving waveform signal Sga, non-driving waveform signal Sgb, or driving periodic signal SgA. Hereinafter only one of them may be referred to). The non-waveform signal Sgn is input to a recording element 15 during non-driving, and the potential is held at the standby potential Vw. The driving waveform signal Sga is input to the recording element 15 during driving, and the potential transitions from the standby potential Vw to one or more displacement potentials (any one or more of V0 to V6). The standby potential Vw of the non-waveform signal Sgn input to at least one of the multiple recording elements 15 is different from the standby potential Vw of the non-waveform signal Sgn input to at least another one of the multiple recording elements 15.

Therefore, for example, the amplitude of the driving waveform signal Sga can be adjusted using the standby potential Vw, and this adjustment can be individually made for the different recording elements 15. As a result, shading spots (unintended shading) caused by variations in the form of the dots (for example, the diameter of the dots) formed by the multiple recording elements 15 can be reduced. In this adjustment method, the displacement potentials V0 to V6 of the driving waveform signal Sga do not need to be adjusted (but may be adjusted.). As a result, for example, candidate displacement potentials V0 to V6 can be shared among the multiple recording elements 15. This allows the configuration of the head controller 37 to be simplified. For example, in this embodiment, the constant voltage source 45 and the pattern signal generation circuit 49 are shared by multiple recording elements 15, and the configuration of the head controller 37 is simplified.

The drive controller (head controller 37) may individually set the standby potential Vw for multiple recording elements 15 (individually for each one). For example, in this embodiment, the selector 71 (storage circuit) provided for each of the recording elements 15 holds information on the standby potential Vw, and the standby potential Vw to be input to each of the recording elements 15 is generated based on this information.

In this case, for example, the shading is adjusted for each of the recording elements 15. As a result, the shading is adjusted with higher precision compared to a mode where the shading is adjusted for each block (each block containing two or more recording elements 15) obtained by dividing the facing surface 3*a* of the head 2 (as already mentioned, such a mode may also be included in techniques related to the present disclosure). This, in turn, improves the effectiveness of reducing shading spots. In addition, although differences in density between the recording elements 15 positioned at the boundaries between the blocks may be increased in block-by-block adjustment, the probability of such an inconvenience is reduced.

The drive controller (head controller 37) may selectively and repeatedly input either a standby signal (for example, non-waveform signal Sgn) or a driving signal (for example, driving waveform signal Sga) to each of the multiple recording elements 15 based on the control signal Sgc2 (Sgc1) according to the image data 43. In each of the multiple recording elements 15, the multiple non-waveform signals Sgn that are repeatedly input may have the same standby potential Vw (any one of V6_0 to V6_8) as each other, regardless of the control signal Sgc2. For example, in an embodiment, the standby potential Vw of the non-waveform signal Sgn input to one recording element 15 is a potential specified by the selector 71 and is constant regardless of the content of information of the control signal Sgc2. In each of the multiple recording elements 15, the multiple driving waveform signals Sga that are repeatedly input may differ from each other in terms of at least one out of the magnitudes and temporal arrangements of one or more displacement potentials (one or more of V0 to V5) in accordance with the control signal Sgc2. For example, in an embodiment, one type of pattern signal Sgp2 is selected by the pattern signal selection circuit 65 from among seven types of pattern signals Sgp2 (or driving waveform signals Sga from another perspective) in accordance with the content of the information of the control signal Sgc2.

In this case, for example, since the standby potential Vw is constant in the recording elements 15, the effect of simplifying the configuration of the head controller 37 is improved. In addition, since multiple driving waveform signals Sga are generated based on differences in at least one out of the magnitude and temporal arrangement of one or more displacement potentials, a variety of (intended) shading can be achieved.

The drive controller (head controller 37) may select a standby potential Vw corresponding to each of the multiple recording elements 15 from among multiple candidate standby potentials V6_0 to V6_8 whose potentials differ from each other. Based on the control signal Sgc2 (or Sgc1) according to the image data 43, the head controller 37 may select a driving signal (for example, a driving periodic signal SgA (or a driving waveform signal Sga from another perspective)) to be input to each of the multiple recording elements 15 from among multiple candidate driving signals (for example, candidates identified from among seven types of pattern signals Sgp2) that differ from one another in terms of at least one out of the magnitude and temporal arrangement of one or more displacement potentials (one or more of V0 to V5). Each of the multiple candidate driving signals may include one or more displacement potentials selected from among multiple candidate displacement potentials V0 to V5 whose potentials differ from each other. At least one of (for example, all of) the potential differences between every pair of candidate standby potentials (for example, V6_8 and V6_7) that are next to each other in the order of the magnitudes of the potentials among the multiple candidate standby potentials V6_0 to V6_8 may be smaller than at least one of (for example, all of) the potential differences between every pair of candidate displacement potentials (for example, V5 and V4) that are next to each other in the order of the magnitudes of the potentials among the multiple candidate displacement potentials V0 to V5.

In this case, for example, a large change in the form (for example, droplet volume) of the discharged droplets can be achieved using multiple displacement potentials having relatively large potential differences therebetween. In other words, an intended change in shading can be made greater. On the other hand, the form of the discharged droplets can be finely adjusted using multiple standby potentials having relatively small potential differences therebetween. In other words, this enables relatively small density differences (unintended density differences) between multiple recording elements 15 to be reduced. Thus, both intended shading and reduction of unintended shading can be achieved.

At least one of (for example, all of) the potential differences between every pair of candidate standby potentials that are next to each other in the order of the magnitudes of the potentials among the multiple standby potential candidates V6_0 to V6_8 may be 2% or less of the potential difference between the candidate V6_8 that is most distant from the multiple candidate displacement potentials among the multiple standby potential candidates and the candidate V0 that is most distant from the multiple candidate standby potentials among the multiple candidate displacement potentials.

In this case, for example, the above-described effect is enhanced by a potential difference between candidate standby potentials being smaller than a potential difference between candidate displacement potentials. For example, assuming a general printer 1 that realizes shading, a potential difference of 2% or less of the potential difference between the standby potential Vw and the candidate displacement potential V0, which is furthest from the standby potential Vw, appears as shading on a recording medium having a density difference that is difficult to discern with the human eye. Therefore, by adjusting shading using a potential difference of 2% or less, density spots can be reduced to a level where the density spots cannot be discerned with the human eye.

Based on the control signal Sgc2 according to the image data 43, the drive controller (head controller 37) may select a driving signal (for example, a driving periodic signal SgA (or a driving waveform signal Sga from another perspective)) to be input to each of the multiple recording elements 15 from among multiple candidate driving waveforms (for example, candidates identified from among seven types of pattern signals Sgp2) that differ from one another in terms of at least one out of the magnitude and temporal arrangement of one or more displacement potentials (one or more of V0 to V5). Multiple candidate driving waveforms are set in common for multiple recording elements 15. For example, in this embodiment, the seven types of pattern signals Sgp2 output from the pattern signal generation circuit 49 are commonly input to multiple recording elements 15, and thus multiple candidate driving waveform signals are used in common.

In other words, the magnitude and temporal arrangement of the displacement potentials in the driving periodic signal SgA (or driving waveform signal Sga) are determined in accordance with the type of operation of the actuator 17 (or, from another perspective, the form of the droplets to be discharged (for example, droplet volume)) and are not dependent on the recording element 15. Therefore, for example, the same number of potential variation patterns (pattern signals Sgp2) are to be prepared as the number of types of operations of the actuator 17 (including standby). As a result, the number of pattern signals Sgp2 can be reduced. In contrast to the above description, a mode in which a different candidate driving waveform is set for at least some of the recording elements 15 than for at least some of the other recording elements 15 may also be included in techniques related to the present disclosure.

The recording head (head 2 or head body 3) may include a pattern signal output circuit (pattern signal generation circuit 49 and multiple pattern signal selection circuits 65), a correction circuit (multiple correction circuits 67), and an operation signal generation circuit (constant voltage source 45 and multiple switch circuits 69). The pattern signal output circuit (49 and 65) may output a pattern signal Sgp2 that includes information specifying a time series of the standby potential Vw and one or more displacement potentials (any one or more of V0 to V5) to which the potential of the operation signal (for example, the individual signal SgI) input to each of the multiple recording elements 15 is to transition. The correction circuit 67 may output a corrected pattern signal Sgm in which the standby potential Vw in the pattern signal Sgp2 is corrected to the standby potential Vw (any one of V6_0 to V6_8) in accordance with the corresponding recording element 15. The operation signal generation circuit (45 and 69) may generate individual signals SgI based on the corrected pattern signal Sgm and input the signals to the corresponding recording elements 15.

In this case, for example, the number of types of pattern signals Sgp2 can be reduced because there is no need to prepare a pattern signal Sgp2 for each different standby potential Vw. As a result, for example, the circuit configuration is simplified.

The pattern signal output circuit may include a generation circuit (pattern signal generation circuit 49) and a selection circuit (multiple pattern signal selection circuits 65). The pattern signal generation circuit 49 may generate multiple types of pattern signals Sgp2 that differ from each other in terms of information relating to at least one out of the magnitude and temporal arrangement of one or more displacement potentials. The multiple pattern signal selection circuits 65 may select one of the multiple types of pattern signals Sgp2 for each of the multiple recording elements in accordance with the control signal Sgc1 (Sgc2) based on the image data 43.

In this case, for example, a pattern signal Sgp2 (Sgp1) does not need to be generated for each of the recording elements 15. Therefore, for example, the effect of simplifying the circuit configuration is improved.

The operation signal generation circuit may include the constant voltage source 45 and multiple switch circuits 69. The constant voltage source 45 may include multiple terminals (output terminals 57) held at multiple standby potentials V6_0 to V6_8 and multiple displacement potentials V0 to V5. Multiple switch circuits 69 may be provided so as to correspond to the multiple recording elements 15. The switch circuits 69 may switch the connections between the multiple output terminals 57 of the constant voltage source 45 and the corresponding recording elements 15.

In this case, for example, operation signals (for example, individual signals SgI) having different standby potentials Vw can be realized with a simple circuit. This is described more specifically below. In Patent Literature 3, when the reference potential (corresponding to the standby potential) of a signal is changed, the amplitude of the waveform of the signal is amplified so that the amplitude of the waveform of the signal increases in accordance with the reference potential after the change, and then the changed reference potential is added to the signal and the resulting signal is output. Compared to this mode (such a mode may also be included in techniques related to the present disclosure), in this embodiment, the amplitude does not need to be calculated in accordance with the amount of change in the reference potential and the amplitude does not need to be changed in accordance with the result of this calculation.

Each of the multiple switch circuits 69 may generate a period of time (refer to FIG. 10) during which the recording element 15 is not connected to any of the multiple output terminals 57 when switching the output terminal 57 connected to the corresponding recording element 15 among the multiple output terminals 57.

In this case, for example, the probability of a short circuit occurring between the output terminals 57 is reduced, as previously described. As a result, for example, power consumption is reduced. The reduction in power consumption reduces an increase in the temperature of the IC 13, for example. As a result, for example, fluctuations in ink discharge characteristics caused by temperature changes are reduced.

Each of the multiple switch circuits 69 may include switches 77 provided for each of the multiple output terminals 57. Each switch 77 may have the corresponding output terminal 57 connected to the input side thereof and the corresponding recording element 15 connected to the output side thereof. The time (transition time T11) until the potential on the output side becomes equal to the potential on the input side (potential of the output terminal 57) from a prescribed potential (for example, the reference potential) when switch 77 is turned on may be longer than the time (transition time T12) until the potential on the output side, which is equal to the potential on the input side, becomes equal to the above prescribed potential when the switch 77 is turned off.

In this case, for example, when the switch 77 is turned on, the time until the potential of the corresponding output terminal 57 is applied to the output side of the other switch 77 can be made relatively long. On the other hand, when the switch 77 is turned off, the time until the potential at the output side of the other switch 77 is applied to the corresponding output terminal 57 can be made relatively short. Therefore, the probability of a short circuit occurring between the output terminals 57 is reduced. The effect achieved by reducing the probability of short circuits is described above. By adjusting the transition times T11 and T12, for example, the operation described above of providing a period of time (refer to FIG. 10) during which the recording element 15 is not connected to any of the multiple output terminals 57 may no longer be necessary.

SECOND EMBODIMENT

Figure 12:
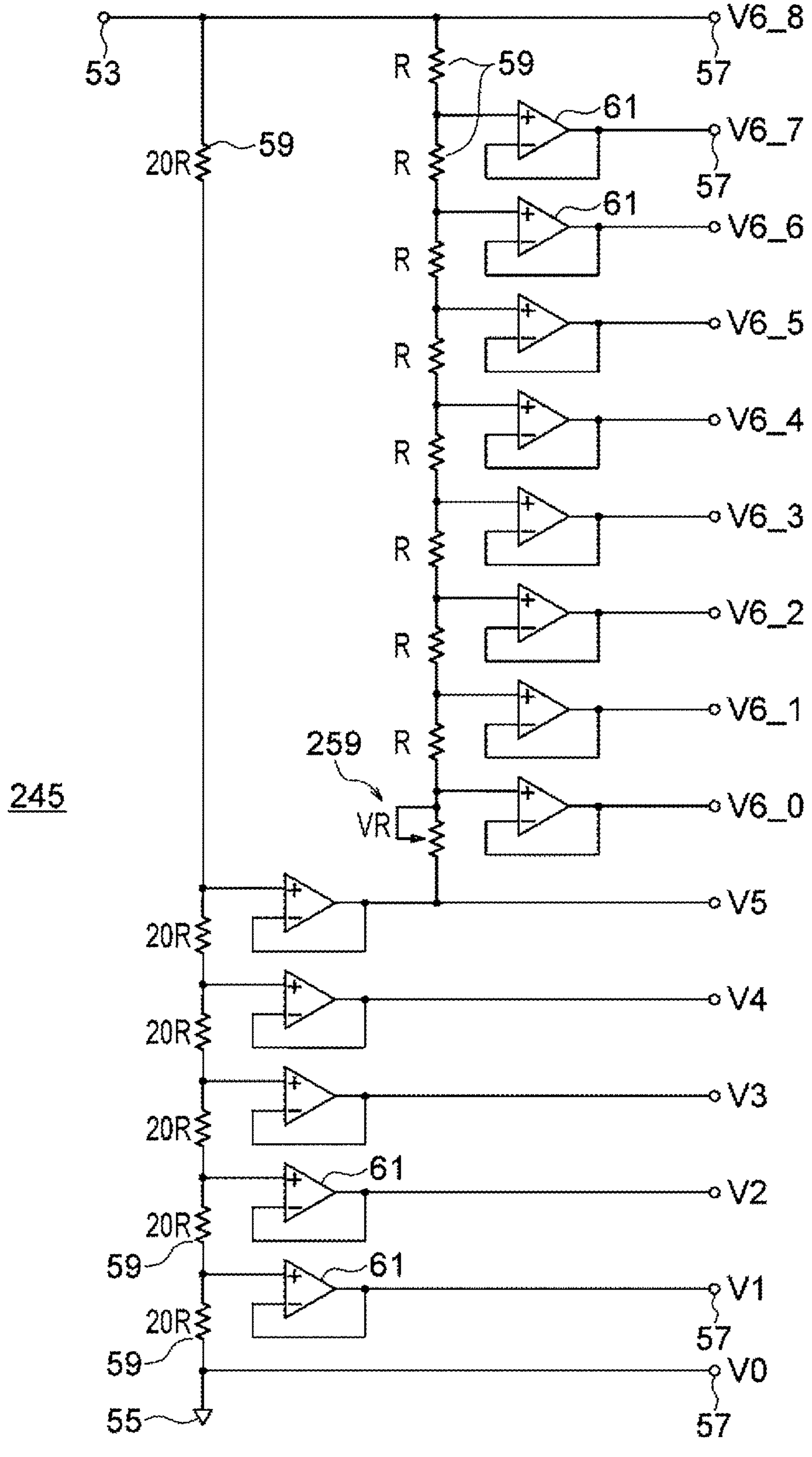
FIG. 12 is a circuit diagram illustrating an example of the configuration of a constant voltage source according to a Second Embodiment.

FIG. 12 is a diagram illustrating a main part of a head according to a Second Embodiment and corresponds to FIG. 8 of the First Embodiment.

A constant voltage source 245 according to the Second Embodiment is able to change the magnitude of the standby potential Vw for at least one (all in the illustrated example) of multiple (nine in the illustrated example) output terminals 57 that hold the standby potentials V6_0 to V6_8. This allows, for example, setting of candidate standby potentials V6_0 to V6_8 that are appropriate for density differences measured for each recording element 15 (or each block). In other words, candidate standby potentials V6_0 to V6_8 can be set for each head.

Various configurations for changing the magnitude of the standby potential Vw held by the output terminals 57 can be adopted. In the example in the figure, the following is illustrated.

Along a path from the input terminal 53 to the reference potential terminal 55, a resistor 59 with a resistance value of 20 R is provided between the input terminal 53 and the node of the non-inverting input of the operational amplifier 61 corresponding to the displacement potential closest to the standby potential (V5 in the illustrated example). The configuration provided between the input terminal 53 and the node of the non-inverting input of the operational amplifier 61 corresponding to the displacement potential V5 (the node to which eight resistors 59 with the resistance value R, one resistor 59 with the resistance value 12 R, and the output terminal 57 corresponding to the standby potential are connected) in the First Embodiment is provided between the input terminal 53 and the output side of the operational amplifier 61 corresponding to the displacement potential V5. However, the resistor 59 with a resistance value of 12 R in the First Embodiment is replaced with a variable resistor 259.

In this configuration, by changing the resistance value of the variable resistor 259, all the standby potentials V6_0 to V6_8 can be changed in proportion to the change in the resistance value of the variable resistor 259. In this case, the magnitudes of the displacement potentials V0 to V5 do not change.

Although not specifically illustrated, the position of the variable resistor 259 may be any of the positions where a resistor 59 with the resistance value R is disposed, or two or more variable resistors 259 may be provided. The constant voltage source 245 may be configured to contain a separate constant voltage source for a standby potential and a separate constant voltage source for a displacement potential, so that changes in the standby potential do not affect the displacement potential.

THIRD EMBODIMENT

Figure 13:
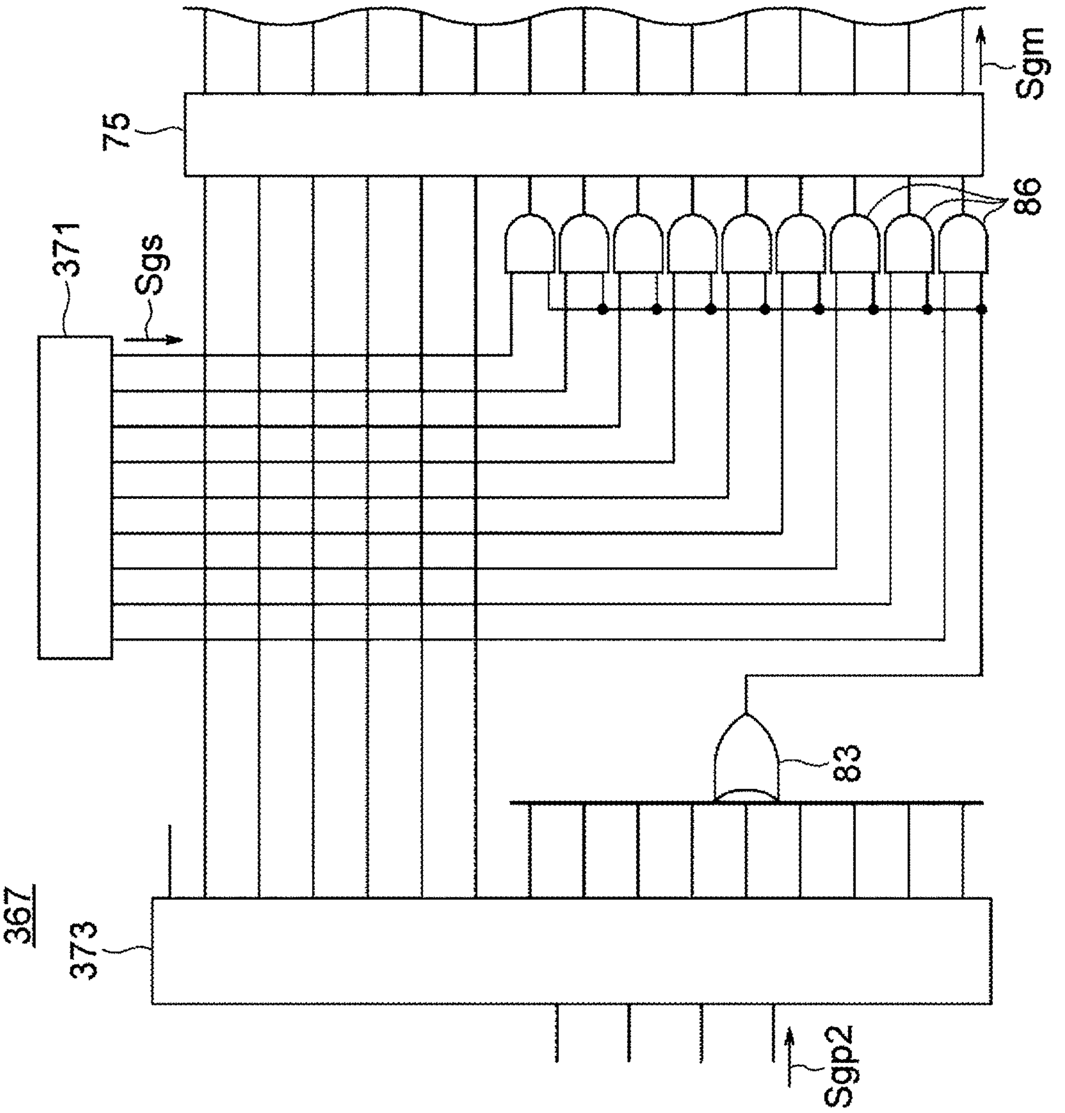
FIG. 13 is a circuit diagram illustrating the configuration of a correction circuit of an element control circuit according to a Third Embodiment.

FIG. 13 is a diagram illustrating a main part of a head according to a Third Embodiment and corresponds to part of FIG. 9 of the First Embodiment.

In a correction circuit 367 of the Third Embodiment, a selection signal Sgs of a selector 371 is input to a level shifter 75 without passing through a decoder 373. This is described more specifically below.

Similarly to the First Embodiment, the correction circuit 367 includes a decoder 373 and a level shifter 75. The correction circuit 367 also includes a selector 371, an OR circuit 83, and multiple AND circuits 86 that are directly or indirectly connected to the decoder 373 and/or the level shifter 75.

The decoder 373 may be basically the same as or similar to the decoder 73 of the First Embodiment except that the decoder 373 does not correct the information of the standby potential Vw based on the selection signal Sgs. When data specifying one of the standby potentials V6_0 to V6_8 is input in the form of the pattern signal Sgp2, the decoder 373 may output a signal from the output terminal corresponding to the input standby potential. In other words, the decoder 373 may handle information on a standby potential similarly to information on a displacement potential.

The decoder 373 may output signals only from predetermined output terminals among the output terminals corresponding to the standby potentials V6_0 to V6_8, regardless of the standby potentials specified by the input data. Unlike in the illustrated example, the decoder 373 may have only one output terminal corresponding to a standby potential rather than having multiple output terminals corresponding to the standby potentials V6_0 to V6_8.

The selection signal Sgs output from the selector 371 contains information specifying the standby potential Vw to be set for the corresponding actuator 17, similarly to as in the First Embodiment. In the First Embodiment, the data format and transmission method of the selection signal Sgs were not specified. In this embodiment, the selection signal Sgs is output from the selector 371 in an output format using a base-N number system, similarly to the signal output by the decoder 73. Here, N is the total number (9) of candidate standby potentials V6_0 to V6_8.

Therefore, the selector 371 has the same number of output terminals (9) as the number of candidate standby potentials, the output terminals having a one-to-one correspondence with the candidate standby potentials V6_0 to V6_8. The selector 371 outputs a signal from only the output terminal corresponding to the standby potential Vw that is to be set for the corresponding actuator 17. This signal may be, for example, the same type of signal as the signal output from the decoder 373 (a signal with a constant potential over the period T2), or may be a different type of signal. Examples of latter type of signal include, for example, a signal that has a different potential than the signal output from the decoder 373 and/or a signal that is continuously output (signal for which there is no concept of a period).

The OR circuit 83 has the input side thereof connected to multiple (nine in the illustrated example) output terminals corresponding to the standby potentials V6_0 to V6_8 out of the output terminals of the decoder 373. The OR circuit 83, for example, outputs a signal over a period during which a signal is input from at least one of the above nine output terminals, and does not output a signal during a period when no signal is input from any of the above nine output terminals. The potential of the signal output by the OR circuit 83 may be the same as or different from the potential of the signal output by the decoder 373.

The input terminals of the multiple AND circuits 86 are connected in a one-to-one manner to the multiple output terminals of the selector 371. The output terminals of the multiple AND circuits 86 are connected in a one-to-one manner to multiple input terminals of the level shifter 75. The output terminals of selector 371 and the input terminals of level shifter 75, to which the AND circuits 86 are connected, have the same corresponding standby potentials Vw. In other words, the multiple AND circuits 86 are provided in a one-to-one manner for multiple candidate standby potentials V6_0 to V6_8. The output of the OR circuit 83 is connected to the inputs of the multiple AND circuits 86. Each AND circuit 86, for example, outputs a signal across a period during which signals are input from both the selector 371 and the OR circuit 83, and otherwise, does not output a signal. The potential of the signals output by the AND circuits 86 is the same as the potential of the signals output by the decoder 373, for example.

In the above configuration, when data serially input to the decoder 373 in the form of the pattern signal Sgp2 specifies a standby potential Vw, a signal is input from the decoder 373 to the OR circuit 83, and a signal is input from the OR circuit 83 to all the multiple AND circuits 86. The signals are then input to the level shifter 75 from the AND circuits 86 to which a signal is input from the selector 371 out of the multiple AND circuits 86. In other words, as in the First Embodiment, a signal corresponding to the standby potential selected by the selector 371 is input to the level shifter 75. The operations performed after that, and the operations performed when the data input to the decoder 373 specifies a displacement potential, are the same as in the First Embodiment.

Thus, instead of the decoder 373 correcting the pattern signal Sgp2, the selector 371 and the AND circuits 86 may correct the pattern signal Sgp2. In this case, the same effects as in the First Embodiment are achieved.

If the pattern signal Sgp2 is corrected by the selector 371 and the AND circuits 86, the OR circuit 83 is not required. For example, the standby potential Vw specified by the pattern signal Sgp2 may be only one of the candidate standby potentials V6_0 to V6_8, and the input sides of all the AND circuits 86 may be connected to the output terminal of decoder 373 corresponding to this one standby potential. However, by providing the OR circuit 83, a corrected pattern signal Sgm that includes information on the standby potential specified by the selector 371 can be generated, even when signals are output from other output terminals due to some malfunction.

FOURTH EMBODIMENT

Figure 14:
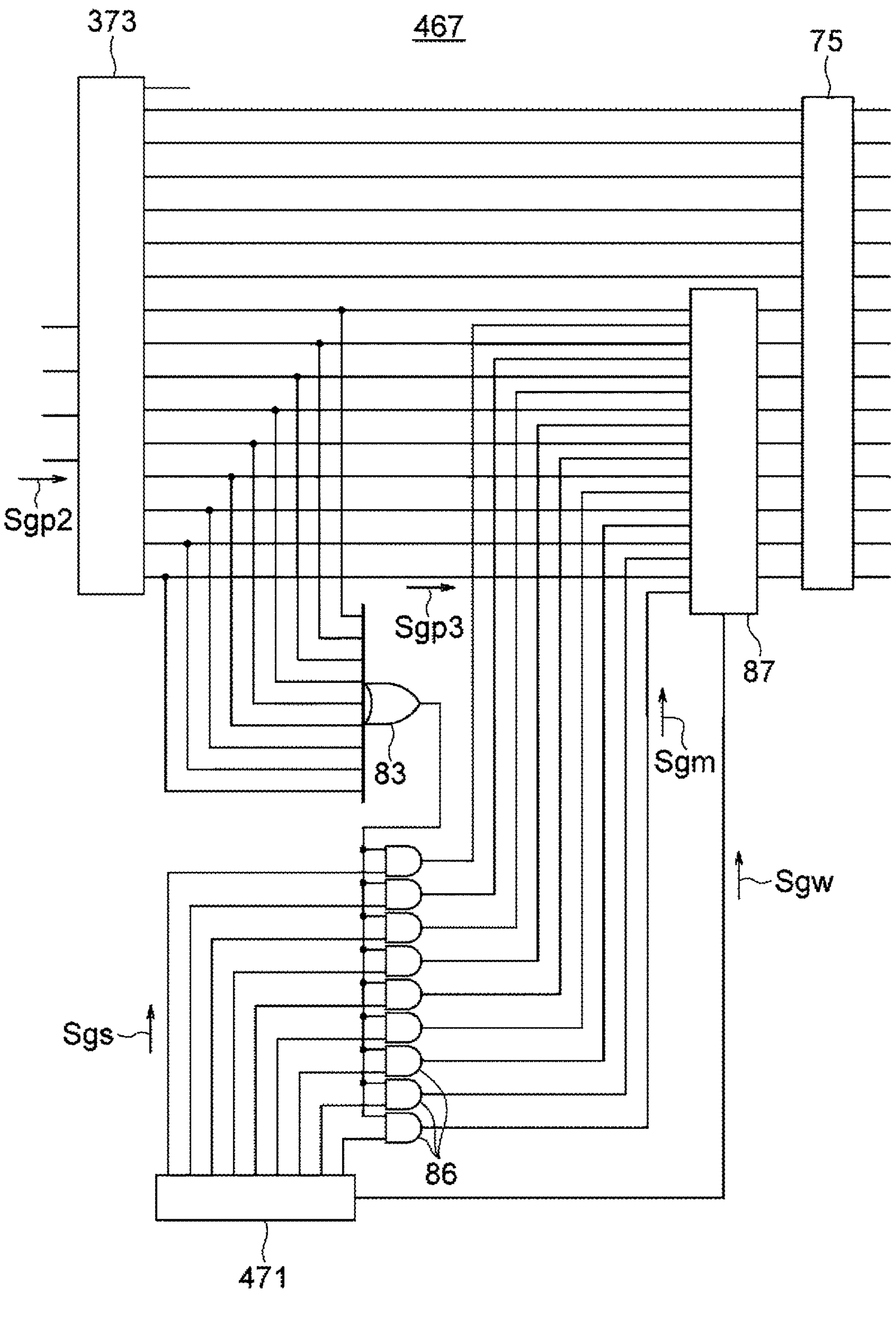
FIG. 14 is a circuit diagram illustrating the configuration of a correction circuit of an element control circuit according to a Fourth Embodiment.

FIG. 14 is a diagram illustrating a main part of a head according to a Fourth Embodiment and corresponds to part of FIG. 9 of the First Embodiment.

A correction circuit 467 of this embodiment is configured to selectively perform an operation of outputting a corrected pattern signal Sgm, in which the standby potential Vw in the pattern signal Sgp2 is corrected, and an operation of outputting a non-corrected pattern signal Sgp3, in which the standby potential Vw in the pattern signal Sgp2 is not corrected. In other words, the correction circuit 467 can switch correction of the standby potential Vw on and off.

The non-corrected pattern signal Sgp3 contains the same information as the pattern signal Sgp2 and may be considered to be the pattern signal. However, in FIG. 14, the non-corrected pattern signal Sgp3 is denoted by a different symbol than the pattern signal Sgp2 for convenience, because, similarly to the corrected pattern signal Sgm, the non-corrected pattern signal Sgp3 is in an output format using a base-N (here, base-15) number system.

Various configurations may be used to achieve the above operations. In the example in the figure, the following is illustrated.

The correction circuit 467, similarly to as in the Third Embodiment, includes a decoder 373 and a level shifter 75, and a selector 471, an OR circuit 83, and multiple AND circuits 86 connected directly or indirectly to the decoder 373 and the level shifter 75. In addition, the correction circuit 467 includes a switching circuit 87 between the multiple AND circuits 86 and the level shifter 75.

Similarly to the selector 371, the selector 471 outputs the selection signal Sgs according to the standby potential Vw set for the corresponding actuator 17 to N (nine) AND circuits 86 in an output format using a base-N (base-9) number system. The selector 471 outputs a switching signal Sgw specifying switching on or off of correction of the standby potential Vw to the switching circuit 87. The switching signal Sgw may be a signal transmitted for both on and off (for example, a signal with a higher or lower potential relative to the reference potential), or a signal may be transmitted at only one out of on and off.

The switching circuit 87 is equipped with at least the following terminals. Multiple (9) input terminals connected in a one-to-one manner to multiple output terminals corresponding to multiple candidate standby potentials V6_0 to V6_8 of the decoder 373. Multiple (9) input terminals connected in a one-to-one manner to the output terminals of multiple AND circuits 86. An input terminal to which the switching signal Sgw is input. Multiple (nine) output terminals connected in a one-to-one manner to multiple input terminals corresponding to multiple candidate standby potentials V6_0 to V6_8 of the level shifter 75.

In the switching circuit 87, the multiple input terminals are connected to the decoder 373, and the multiple output terminals are connected to the level shifter 75. Each of the multiple input terminals is paired up with a corresponding one of the multiple output terminals, the input terminal and the output terminal corresponding to the same candidate standby potential. In each pair, the input terminal and the output terminal can be electrically connected to each other with a one-to-one correspondence. Similarly, in the switching circuit 87, the multiple input terminals are connected to the multiple AND circuits 86, and the multiple output terminals are connected to the level shifter 75. Each of the multiple input terminals is paired up with a corresponding one of the multiple output terminals, the input terminal and the output terminal corresponding to the same candidate standby potential. In each pair, the input terminal and the output terminal can be electrically connected to each other with a one-to-one correspondence.

When "on" is specified by the switching signal Sgw, the switching circuit 87 connects the multiple input terminals connected to the multiple AND circuits 86 and the multiple output terminals to each other, and disconnects the multiple input terminals connected to the decoder 373 and the multiple output terminals from each other. Conversely, when "off" is specified by the switching signal Sgw, the multiple input terminals connected to the decoder 373 and the multiple output terminals are connected to each other, and the multiple input terminals connected to the multiple AND circuits 86 and the multiple output terminals are disconnected from each other.

Therefore, when "on" is specified by the switching signal Sgw and a signal specifying a standby potential in an output format using a base-9 number system from the multiple AND circuits 86 is input to the switching circuit 87, the signal from these multiple AND circuits 86 is output to the level shifter 75. In other words, similarly to the First Embodiment, a signal corresponding to the standby potential selected by the selector 471 is input to the level shifter 75.

When "off" is specified by the switching signal Sgw and a signal specifying the standby potential in an output format using a base-9 number system is input to the switching circuit 87 from the output terminals corresponding to the standby potential of the multiple decoders 373, the signal from the decoder 373 is output to the level shifter 75. In other words, the signal corresponding to the standby potential specified by the pattern signal Sgp2 is input to the level shifter 75.

The operations performed subsequent to switching on or off according to the switching signal Sgw and operations performed when data input to the decoder 373 specifies a displacement potential are the same as in the First Embodiment.

The signal output by the switching circuit 87 to the level shifter 75 is, for example, the same as the signal output from the output terminal corresponding to the displacement potential of the decoder 373 to the level shifter 75. The signals output from the output terminal corresponding to the standby potential of the decoder 373, the output terminal corresponding to the standby potential of the selector 471, and the multiple AND circuits 86 may be the same as or different from the signal output by the output terminal corresponding to the displacement potential of the decoder 373.

Whether the selector 471 specifies on or off using the switching signal Sgw may be set as appropriate. For example, the selector 471 may include a volatile register and may acquire information specifying on or off from a memory, which is not illustrated, shared by multiple element control circuits 51 in the head 2 or the control device 88, each time the printer is operated. The information may be acquired from the memory or control device 88 at an appropriate time such as when a prescribed operation is performed on the printer. For example, the selector 471 may include a non-volatile register and may constantly hold the information. The contents of the information may be set by the manufacturer of the head (or the printer) or by the printer (refer to Fifth Embodiment below).

Figure 15A:
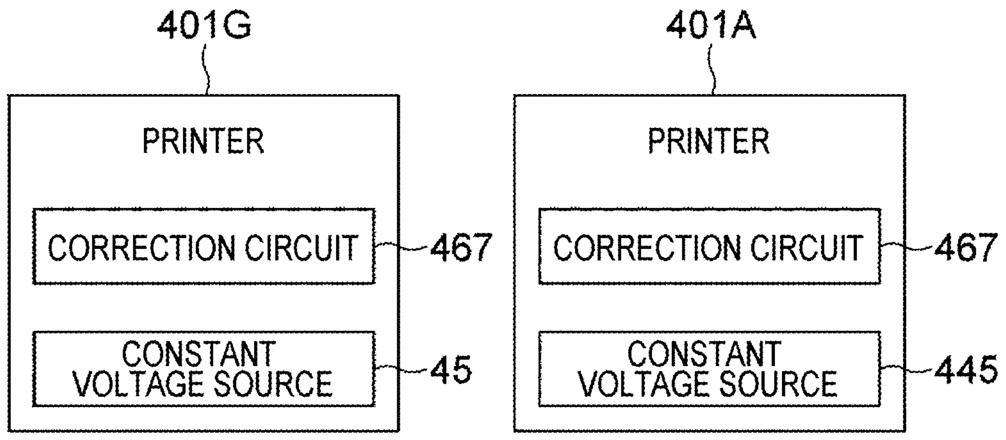
FIG. 15A is a block diagram illustrating an example of the use of the correction circuit according to the Fourth Embodiment.
Figure 15B:
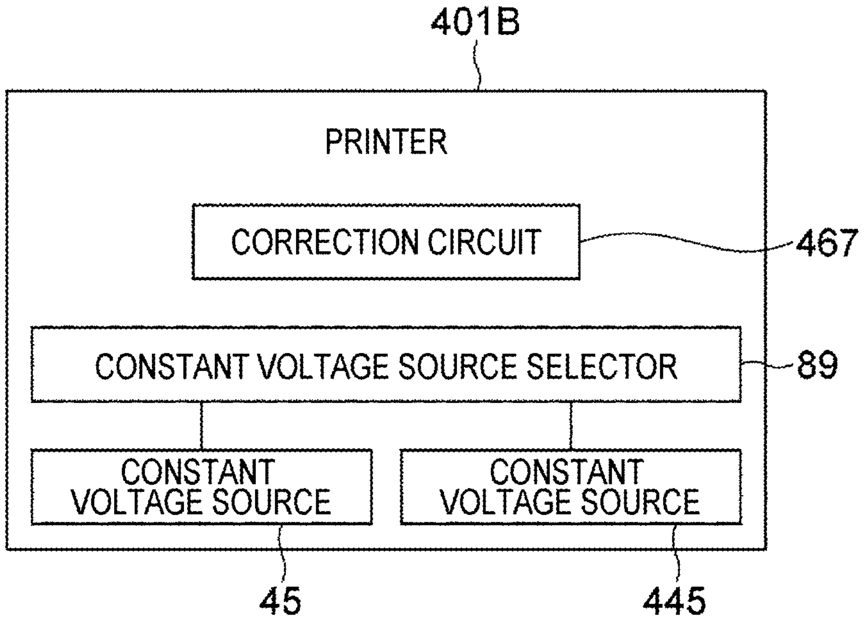
FIG. 15B is a block diagram illustrating another example of the use of the correction circuit according to the Fourth Embodiment.

FIGS. 15A and 15B are block diagrams illustrating an example of the use of the correction circuit 467 according to the Fourth Embodiment.

FIG. 15A illustrates a printer 401G including a constant voltage source 45 and a printer 401A including a constant voltage source 445 having a different configuration from the constant voltage source 45. The printers 401G and 401A both include the correction circuit 467 according to the Fourth Embodiment. In the printer 401G, a function of the correction circuit 467 for correcting the standby potential Vw is turned on. In the printer 401A, a function of the correction circuit 467 for correcting the standby potential Vw is turned off. As a result, for example, some or all of the multiple components of the head controller, excluding the constant voltage source, can be shared by printers of different types. As a result, productivity is improved.

FIG. 15B illustrates a printer 401B including a constant voltage source 45 and a constant voltage source 445. The printer 401B includes a constant voltage source selector 89 that can switch the constant voltage source that is used between the constant voltage sources 45 and 445. When the constant voltage source 45 is selected by the constant voltage source selector 89, the function of the correction circuit 467 for correcting the standby potential Vw is turned on. When the constant voltage source 445 is selected by the constant voltage source selector 89, the function of the correction circuit 467 for correcting the standby potential Vw is turned off. Thus, two types of constant voltage sources can be used in one printer 401B to achieve different modes of printing.

Figure 16:
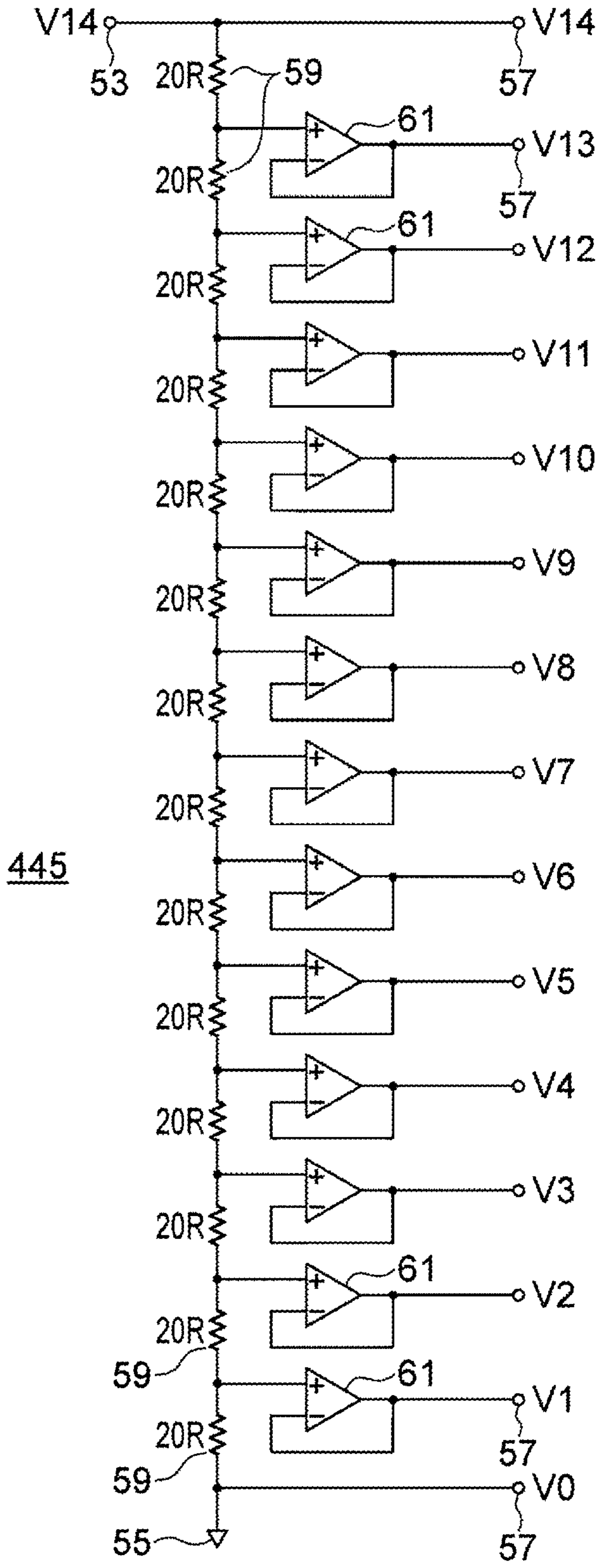
FIG. 16 is a circuit diagram illustrating an example of the configuration of a constant voltage source used to generate an operation signal for which a standby potential is not corrected according to the Fourth Embodiment.

FIG. 16 illustrates an example of the constant voltage source 445 and corresponds to FIG. 8.

In the constant voltage source 445, the resistance values of all the resistors 59 are identical to each other in a configuration the same as or similar to that of the constant voltage source 45. Therefore, potential differences between potentials that are adjacent to each other in order of their magnitudes are the same as each other among the multiple potentials held by the multiple output terminals 57.

Figure 17:
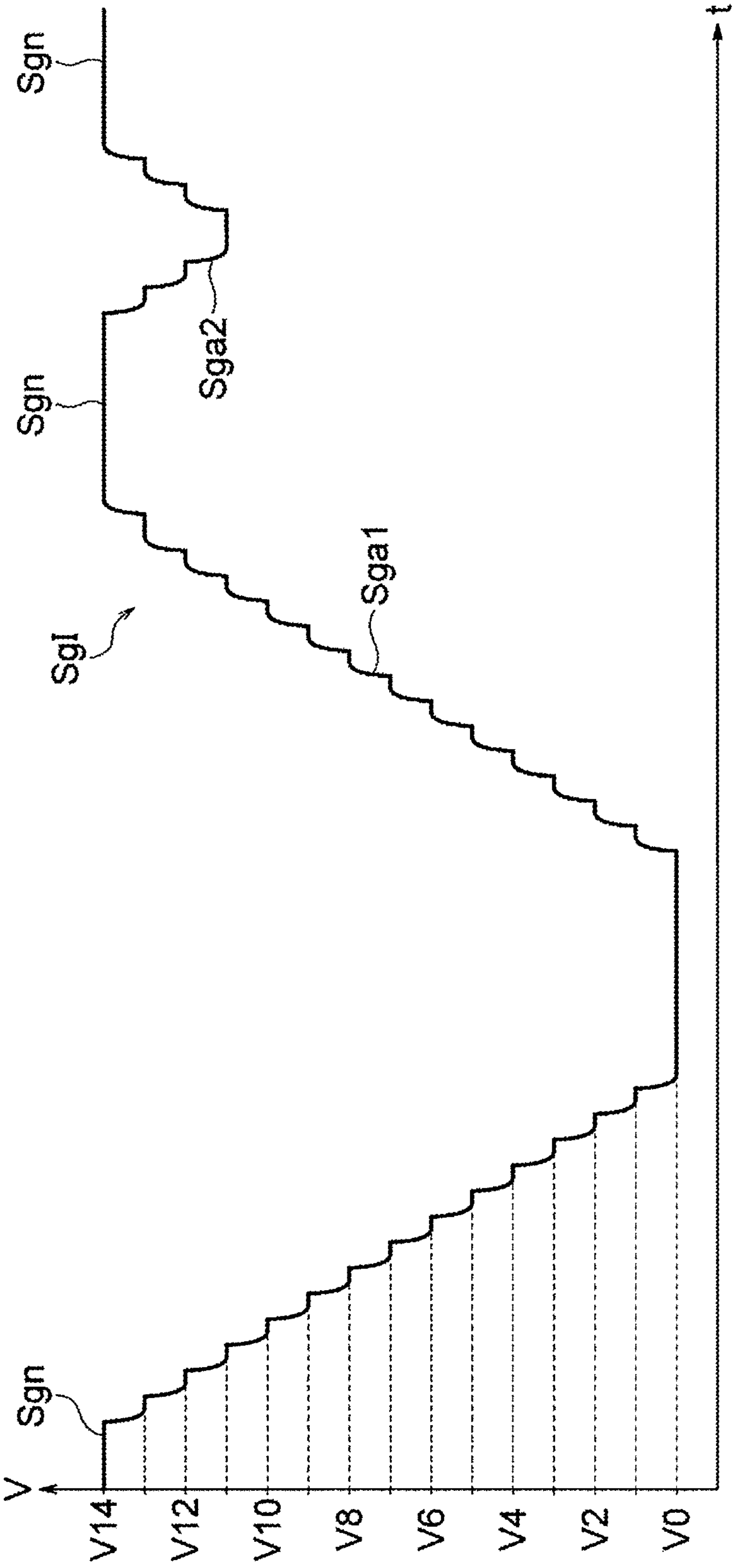
FIG. 17 is a diagram illustrating an example of the waveform of an individual signal generated using the constant voltage source in FIG. 16.

FIG. 17 illustrates an example of the waveform of the individual signal SgI generated using the constant voltage source 445 and corresponds to FIG. 5.

With the function for correcting the standby potential Vw in the correction circuit 467 is turned off, the waveform of the individual signal SgI is formed using multiple potentials of the constant voltage source 445 based on information of the potentials contained in the pattern signal Sgp2. In the illustrated example, multiple potentials are utilized as one standby potential V14 and multiple displacement potentials V0 to V13.

As described above, the correction circuit 467 may selectively perform an operation of outputting a corrected pattern signal Sgm, in which the standby potential Vw in the pattern signal Sgp2 is corrected, and an operation of outputting a non-corrected pattern signal Sgp3, in which the standby potential Vw in the pattern signal Sgp2 is not corrected.

In this case, for example, as described above, the parts of the head controller excluding the constant voltage source can be made generic to improve productivity and enable use of different printing modes in a single printer.

FIFTH EMBODIMENT

Figure 18:
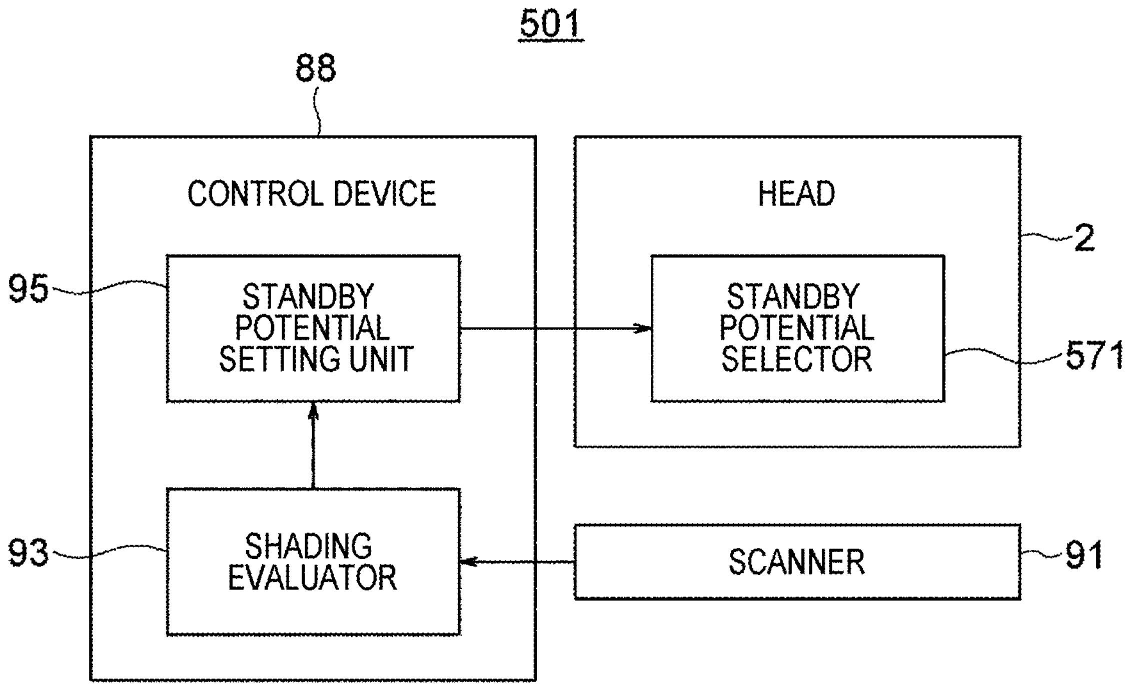
FIG. 18 is a block diagram illustrating an overview of the configuration of a recording device according to a Fifth Embodiment.

FIG. 18 is a block diagram illustrating an overview of the configuration of a printer 501 according to a Fifth Embodiment.

The printer 501 is configured so as to be able to set the standby potential Vw itself for each actuator 17. This is described more specifically below.

The printer 501 includes a scanner 91 in addition to a configuration the same as or to similar to that of the printer 1 of the First Embodiment (or a printer of another embodiment). The scanner 91 reads an image printed on a recording medium (for example, printing paper P) by the head 2 and generates image data. A shading evaluator 93 of the control device 88 identifies (evaluates) the presence or absence of shading spots and their degree of shading based on the acquired image data. A standby potential setting unit 95 of the control device 88 sets the standby potential Vw in each of the multiple recording elements 15 based on the results of the evaluation performed by the shading evaluator 93 so that shading spots are reduced. A standby potential selector 571 of the head 2 stores the standby potentials Vw set by the standby potential setting unit 95 in the multiple selectors 71 (or selectors in other embodiments).

The shading evaluator 93, for example, evaluates differences in density between the recording elements 15 (in other words, evaluates the density for each recording element.). For example, when the dpi of the image data generated by the reading performed by the scanner 91 is converted to a dpi on the recording media, the image data is generated so that the converted dpi is higher than the dpi of the image to be printed by the printer 501. The shading evaluator 93 evaluates the differences in density by comparing the densities of regions where dots are formed by each of the recording elements 15 among the multiple recording elements based on image data having a higher resolution. The standby potential setting unit 95 then sets (for example, selects from among candidate standby potentials) a standby potential Vw for each of the recording elements 15 based on the evaluation of the density of each of the recording elements 15.

The image used to evaluate the differences in density may be selected as appropriate so that evaluation of the differences in density can be appropriately performed. The evaluation of density and the setting of standby potentials, described above as operations performed by the printer 501, may be performed by a device external to the printer.

In the First to Fifth Embodiments described above, the printers 1, 401G, 401A, and 401B are examples of recording devices. The head controller 37 is an example of a drive controller. The individual signal SgI or periodic signal SgT is an example of an operation signal, the non-waveform signal Sgn is an example of a standby signal, and the driving waveform signal Sga and the non-driving waveform signal Sgb are examples of a driving signal. However, a non-driving periodic signal SgN, which does not include a non-driving waveform signal Sgb, may be taken as an example of a standby signal. A driving periodic signal SgA, in which the potential is displaced not only to the displacement potential but also to the standby potential, may be taken as an example of a driving signal. The combination of the pattern signal generation circuit 49 and at least one pattern signal selection circuit 65 is an example of a pattern signal output circuit. At least one correction circuit 67, 367, or 467 is an example of a correction circuit. The combination of the constant voltage source 45 and at least one switch circuit 69 is an example of an operation signal generation circuit. The pattern signal generation circuit 49 is an example of a generation circuit. The pattern signal selection circuit 65 is an example of a selection circuit.

Techniques according to the present disclosure are not limited to the above embodiments and may be implemented in the form of various modes.

Recording devices are not limited to inkjet printers. For example, recording devices may be thermal printers that apply heat to thermal paper or ink film. In this case, the multiple recording elements are multiple heating units arranged so as to apply heat to the thermal paper and ink film. A heating unit includes, for example, a heating element layer, a common electrode positioned on the heating element layer, and individual electrodes positioned on the heating element layer and facing the common electrode. Operation signals (standby and driving signals) are input to the individual electrodes. Inkjet printers are not limited to piezoelectric-type printers, and can also be thermal printers.

In a thermal printer, for example, the temperature of the heating unit can be increased in advance before forming dots using a potential difference between the standby potential and the reference potential, and this in turn, increases the density. Therefore, when a higher density is desired, the standby potential may be set so that the standby potential is closer to the displacement potential (i.e., the amplitude of the driving signal is smaller), in contrast to the inkjet printer of the embodiments. In a thermal inkjet printer, the standby potential may be set so that the amplitude of the driving signal is increased when a higher density is desired, similarly to as in the inkjet printers of the embodiments.

Recording devices are not limited to those that convey recording media. A robot may move a head relative to a car body (recording medium) and discharge paint from the head onto the car body. A recording device may be a so-called hand-held printer, which is grasped by a person's hand and moved relative to a recording medium. In such a recording device, a signal (periodic signal SgT) may be output every period, or a signal such as a periodic signal SgT may be output for every prescribed amount of movement.

The drive controller that inputs the operation signals to the recording elements may be at least partially provided outside the head. For example, a constant voltage source may be provided outside the head (for example, control device 88) and a pattern signal output circuit and so forth may be provided in the head.

As mentioned in the description of the embodiments, reduction of density spots by adjusting the standby potential may be performed for each block containing two or more recording elements. In this case, the configuration of the drive controller (for example, head controller 37) may be any appropriate configuration. For example, the selector (71 and so on) that selects the standby potential may be shared by multiple recording elements. The configuration itself may be the same as or similar to that in the embodiments, but the standby potential for each recording element may be set based on the density differences between blocks.

In this embodiment, density spots are reduced by adjusting the standby potential, and therefore the displacement potential does not need to be adjusted in order to reduce density spots. However, the displacement potential may be adjusted in order to reduce density spots.

REFERENCE SIGNS

1 printer,
2 head,
3 head body,
15 recording element,
37 head controller (drive controller),
Sgn non-waveform signal (standby signal),
Sga driving signal (driving waveform signal),
Vw and V6_0 to V6_8 standby potential,
V0 to V6 displacement potential.

The invention claimed is:

1. A recording head comprising:

multiple recording elements configured to form dots that make up an image; and a drive controller configured to input an operation signal to each recording element of the multiple recording elements, wherein the operation signal includes a standby signal input to each recording element during a non-driving state in which a potential of the operation signal is held at a standby potential, a driving signal input to each recording element during a driving state in which the potential of the operation signal transitions from the standby potential to one or more displacement potentials, and the standby potential of the standby signal input to at least one of the multiple recording elements is different from the standby potential of the standby signal input to at least another one of the multiple recording elements, wherein the drive controller is configured to:

select the standby potentials corresponding to each recording element of the multiple recording elements from among multiple candidate standby potentials having different potentials from each other, and select the driving signal input to be input to each recording element of the multiple recording elements from among multiple candidate driving signals in which at least one out of a magnitude and a temporal arrangement of the one or more displacement potentials differ from each other, the drive controller configured to make the selection based on a control signal corresponding to image data, wherein each of the multiple candidate driving signals includes the one or more displacement potentials selected from among multiple candidate displacement potentials whose potentials differ from each other, and a potential difference between two candidate standby potentials that are next to each other in order of magnitude of potential among the multiple candidate standby potentials is smaller than a potential difference between two candidate displacement potentials that are next to each other in order of magnitude of potential among the multiple candidate displacement potentials.

2. The recording head according to claim 1, wherein the drive controller individually sets the standby potential for each recording element of the multiple recording elements.

3. The recording head according to claim 1, wherein the potential difference between the two candidate standby potentials that are next to each other in order of magnitude of potential among the multiple candidate standby potentials is 2% or less of a potential difference between a candidate, among the multiple candidate standby potentials, that is furthest away from the multiple candidate displacement potentials and a candidate, among the multiple candidate displacement potentials, that is furthest away from the multiple candidate standby potentials.

4. The recording head according to claim 1, wherein the drive controller is configured to select the driving signal input to be input to each recording element of the multiple recording elements from among multiple candidate driving waveforms in which at least one out of a magnitude and a temporal arrangement of the one or more displacement potentials differ from each other, the drive controller configured to make the selection based on a control signal corresponding to image data, and the multiple candidate driving waveforms are set in common for the multiple recording elements.

5. The recording head according to claim 1, further comprising:

a pattern signal output circuit configured to output a pattern signal that includes information specifying a time series of the standby potential and the one or more displacement potentials to which the potential of the operation signal that is input to each of the multiple recording elements is to transition;

a correction circuit configured to output a corrected pattern signal in which a standby potential in the pattern signal is corrected to a standby potential in accordance with a corresponding recording element; and an operation signal generation circuit configured to generate the operation signal based on the corrected pattern signal, and to input the operation signal to the corresponding recording element.

6. The recording head according to claim 5, wherein the pattern signal output circuit includes a generation circuit configured to generate multiple types of the pattern signal in which pieces of information relating to at least one out of a magnitude and a temporal arrangement of the one or more displacement potentials differ from each other, and a selection circuit configured to select one of the multiple types of pattern signals for each of the multiple recording elements in accordance with a control signal based on image data.

7. The recording head according to claim 5, wherein the correction circuit is configured to selectively perform an operation of outputting the corrected pattern signal in which the standby potential in the pattern signal has been corrected, and an operation of outputting a non-corrected pattern signal in which the standby potential in the pattern signal has not been corrected.

8. The recording head according to claim 5, wherein the operation signal generation circuit includes a constant voltage source having multiple terminals held at a plurality of the standby potentials and a plurality of the one or more displacement potentials, and multiple switch circuits provided so as to respectively correspond to the multiple recording elements, and configured to switch connections between the multiple terminals of the constant voltage source and corresponding recording elements of the multiple recording elements.

9. The recording head according to claim 8, wherein the constant voltage source is capable of changing a magnitude of the standby potential held by at least one of the multiple terminals holding a plurality of standby potentials.

10. The recording head according to claim 8, wherein when each of the multiple switch circuits switches a terminal of the multiple terminals connected to the corresponding recording element elements, a period of time is provided during which the recording element is not connected to any of the multiple terminals.

11. The recording head according to claim 8, wherein each of the multiple switch circuits includes a switch provided for each of the multiple terminals, a corresponding terminal being connected to an input side of the switch and a corresponding recording element being connected to an output side of the switch, and wherein a time taken for a potential on the output side to go from a prescribed potential to be equal to a potential on the input side when the switch is turned on is longer than a time taken for a potential on the output side, which is equal to the potential on the input side, to reach the prescribed potential when the switch is turned off.

12. The recording head according to claim 1, wherein the multiple recording elements each include a nozzle configured to discharge liquid, and an actuator configured to apply a pressure to liquid inside the nozzle.

13. A recording device comprising:

multiple recording elements configured to form dots that make up an image;

a control signal output unit configured to generate a control signal based on image data; and a drive controller configured to input an operation signal to each recording element of the multiple recording elements based on the control signal, wherein the operation signal includes a standby signal input to each recording element during a non-driving state in which a potential of the operation signal is held at a standby potential, a driving signal input to each recording element during a driving state in which the potential of the operation signal transitions from the standby potential to one or more displacement potentials, and the standby potential of the standby signal input to at least one of the multiple recording elements is different from the standby potential of the standby signal input to at least another one of the multiple recording elements wherein the drive controller is configured to:

select the standby potentials corresponding to each recording element of the multiple recording elements from among multiple candidate standby potentials having different potentials from each other, and select the driving signal input to be input to each recording element of the multiple recording elements from among multiple candidate driving signals in which at least one out of a magnitude and a temporal arrangement of the one or more displacement potentials differ from each other, the drive controller configured to make the selection based on a control signal corresponding to image data, wherein each of the multiple candidate driving signals includes the one or more displacement potentials selected from among multiple candidate displacement potentials whose potentials differ from each other, and a potential difference between two candidate standby potentials that are next to each other in order of magnitude of potential among the multiple candidate standby potentials is smaller than a potential difference between two candidate displacement potentials that are next to each other in order of magnitude of potential among the multiple candidate displacement potentials.

* * * * *